(12) United States Patent
Das et al.

(10) Patent No.: US 11,269,900 B2
(45) Date of Patent: Mar. 8, 2022

(54) TRANSITION REGULARIZED MATRIX FACTORIZATION FOR SEQUENTIAL RECOMMENDATION

(71) Applicant: Visa International Service Association, San Francisco, CA (US)

(72) Inventors: Mahashweta Das, Foster City, CA (US); Hao Yang, San Jose, CA (US); Shamim Samadi, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/052,487

(22) PCT Filed: May 4, 2018

(86) PCT No.: PCT/US2018/031179
§ 371 (c)(1),
(2) Date: Nov. 2, 2020

(87) PCT Pub. No.: WO2019/212570
PCT Pub. Date: Nov. 7, 2019

(65) Prior Publication Data
US 2021/0263939 A1    Aug. 26, 2021

(51) Int. Cl.
*G06F 17/00* (2019.01)
*G06F 7/00* (2006.01)
(Continued)

(52) U.S. Cl.
CPC ...... *G06F 16/24578* (2019.01); *G06F 16/248* (2019.01); *G06F 16/2453* (2019.01); *G06Q 30/0631* (2013.01)

(58) Field of Classification Search
CPC .......... G06F 16/24578; G06F 16/2453; G06F 16/248; G06Q 30/0631
(Continued)

(56) References Cited

U.S. PATENT DOCUMENTS 5,838,462 A * 11/1998 Ebner ...................... H04N 1/52
358/3.23
8,010,523 B2 * 8/2011 Djabarov ............ G06F 16/3322
707/721

(Continued)

OTHER PUBLICATIONS

He et al.,"Inferring a Personalized Next Point-of-Interest Recommendation Model with Latent Behavior Patterns", Proceedings of the Thirtieth AAAI Conference on Artificial Intelligence (AAAI-16),2016,pp. 137-140 (Year: 2016).*
(Continued)

*Primary Examiner* — Pavan Mamillapalli
(74) *Attorney, Agent, or Firm* — Kilpatrick Townsend & Stockton LLP

(57) ABSTRACT

Apparatuses, methods, and systems are provided for making sequential recommendations using transition regularized non-negative matrix factorization. A non-application specific collaborative filtering based personalized recommender system can recommend a next logical item from a series of related items to a user. The recommender system can recommend a next desirable or series of next desirable new items to the user based on the historical sequence of all user-item preferences and a user's most recent interaction with an item. An asymmetric item-to-item transition matrix can capture aggregate sequential user-item interactions to design a loss function for matrix factorization that incorporates the transition information during decomposition into low-rank factor matrices.

20 Claims, 11 Drawing Sheets

(51) Int. Cl.
*G06F 16/2457* (2019.01)
*G06F 16/2453* (2019.01)
*G06F 16/248* (2019.01)
*G06Q 30/06* (2012.01)

(58) Field of Classification Search
USPC ............................................................ 707/719
See application file for complete search history.

(56) References Cited

U.S. PATENT DOCUMENTS

| | | | | |
|---|---|---|---|---|
| 10,304,008 | B2* | 5/2019 | Min | G05B 13/04 |
| 2007/0291640 | A1* | 12/2007 | Zhang | H04L 5/0025 |
| | | | | 370/210 |
| 2010/0054115 | A1* | 3/2010 | Roh | H04L 27/26265 |
| | | | | 370/208 |
| 2010/0268661 | A1 | 10/2010 | Levy et al. | |
| 2011/0090394 | A1* | 4/2011 | Tian | H04N 19/97 |
| | | | | 348/424.1 |
| 2013/0064318 | A1* | 3/2013 | Liu | H04B 7/0663 |
| | | | | 375/267 |
| 2016/0012088 | A1 | 1/2016 | Rossi et al. | |
| 2016/0171036 | A1* | 6/2016 | Kim | G06F 16/2457 |
| | | | | 707/743 |
| 2016/0217374 | A1 | 7/2016 | Volkovs et al. | |
| 2016/0217385 | A1 | 7/2016 | Choi et al. | |
| 2016/0232540 | A1* | 8/2016 | Gao | G06Q 30/0201 |
| 2016/0275416 | A1* | 9/2016 | Min | G05B 13/04 |
| 2018/0137192 | A1* | 5/2018 | Zaribafiyan | G06F 16/285 |
| 2020/0043189 | A1* | 2/2020 | Bao | G06T 7/75 |

OTHER PUBLICATIONS

He et al., "Inferring a Personalized Next Point-of-Interest Recommendation Model with Latent Behavior Patterns", Proceedings of the Thirtieth AAAI Conference on Artificial Intelligence (AAAI-16), 2016, pp. 137-140.
PCT/US2018/031179, "International Search Report and Written Opinion", dated Feb. 28, 2019, 16 pages.

* cited by examiner $$\begin{array}{c|cccccc} & I_1 & I_2 & I_3 & I_4 & I_5 & I_6 \\ \hline I_1 & 0 & 0 & 0 & 0 & 0 & 0 \\ I_2 & 1 & 0 & 1 & 0 & 1 & 0 \\ I_3 & 0 & 1 & 0 & 1 & 0 & 0 \\ I_4 & 0 & 0 & 0 & 1 & 2 & 0 \\ I_5 & 0 & 0 & 0 & 0 & 0 & 1 \\ I_6 & 0 & 0 & 0 & 0 & 0 & 0 \\ \end{array}$$

FIG. 5

TRANSITION REGULARIZED MATRIX FACTORIZATION FOR SEQUENTIAL RECOMMENDATION

This application is a 371 patent application of International Application No. PCT/US2018/031179, filed on May 4, 2018 titled "TRANSITION REGULARIZED MATRIX FACTORIZATION FOR SEQUENTIAL RECOMMENDATION", which is herein incorporated by reference in its entirety for all purposes.

BACKGROUND

Recommender systems have been used in practice to produce predictive models for use in consumer applications such as trip planning, entertainment viewing, and product purchasing. In some cases, applications analyze user data via matrix factorization and modeling to determine a next item for recommendation to a user. Efforts have been made to develop sequential recommendation approaches that consider users' sequential activity patterns in order to predict users' next actions.

Previous approaches to sequential recommendation applications suffer from various problems. It is beneficial to provide more accurate recommendations to users, especially when user data may be lacking. Embodiments of the invention are directed to addressing the problems encountered when attempting to provide sequential recommendations for various types of items.

BRIEF SUMMARY

Embodiments provide apparatuses, methods, and systems provide more robust and accurate solutions for making sequential recommendations. Sequential recommendations can be made by (i) using a transition matrix defining the likelihood of one item following another item to fill in data gaps of a user rating matrix, and (ii) using a most recent item along with a set of most recent few items.

Various embodiments can consider implicit feedback, which includes data that is unconsciously provided by a user or system monitoring a user's activity (e.g., user locations, purchases), as well as explicit feedback, which includes data that is consciously entered by the user (e.g., user ratings). Based on sets of implicit and explicit information from multiple users, a user-item preference matrix can be created describing a user preference for each item. Various embodiments can generate a transition matrix, which captures the number of users transitioning from one item to another item for any set of related items. The transition matrix can be used to regularize the user-item preference matrix, allowing the prediction of ratings for specific items where no historic user data for those items existed. The resulting transition-regularized preference matrix can be used to determine user factor and item factor submatrices, which can be considered along with the most recent user-item feedback in order to determine the next most likely item a user would be expected to interact with. A user can employ the recommender system several times to retrieve the next item at each instance. Thus, each subsequent recommended item is taken into account when determining the next immediate recommended item, even if the user has yet to review or consume that prior recommended item. Embodiments can be implemented in a variety of application (e.g., movies, travel, product purchasing, etc.), and are not limited to any specific application.

Embodiments can determine likely user-item preference ratings for various users. Sets of historic user ratings can correspond to a set of related items (e.g., a movie series, similar types of restaurants proximally located to each other, tourist attractions within an area, common product pairing purchases, etc.), such that the historic user ratings can be non-binary numbers that represent a user rating for each item. A user-item preference matrix can be generated to include user-item preference values for various items from the series of related items based on the historic user ratings. A transition matrix can be generated by aggregating a total number of users transitioning between various paired combinations of items from the series of related items. Using the transition matrix, the user-item preference matrix can be factorized to obtain a nonnegative user factor submatrix representing latent user factors and a non-negative item factor submatrix representing latent item factors. Paired combinations of items having a higher transition value can have similar latent item factors. The factorization of the user-item preference matrix via the transition matrix can optimize a cost function that includes a transition regularization penalty. An estimated user-item preference matrix can be determined based on the non-negative user factor and item factor submatrices. The estimated user-item preference matrix can include estimated user preference values absent from the user-item preference matrix, such that the estimated user preference values represent an anticipated rating a user may give an item. The estimated user-item preference matrix can be used for purposes of determining a next logical item to recommend to the user.

According to another embodiment, an item or series of items can be recommended to a user based on the most recent user-interacted item and the most recent series of user-interacted items. A user can request a recommendation for an item from a series of related items. Within the series of related items, a number of those items can be identified as having been interacted with by the user (e.g., the user purchased a product, gave a rating, visited a location, watched a movie, etc.). A score can be determined for each of the items within the series of related items based on (i) an element of an estimated user-item preference matrix, where the element corresponds to the requesting user and an item, and (ii) a transition penalty term which can include a distance from the recent user-interacted items and the item to be scored. The determined score can represent a probability of an item being selected after the recent user-interacted items. Based on the score for each item within the series of related items, the user can be provided with a recommendation for the item.

These and other embodiments of the invention are described in detail below. For example, other embodiments are directed to systems, devices, and computer readable media associated with methods described herein.

A better understanding of the nature and advantages of embodiments may be gained with reference to the following detailed description and the accompanying drawings.

BRIEF DESCRIPTION OF THE DRAWINGS

FIG. 5 is an item-item transition matrix according to embodiments.

TERMS

Figure 1:
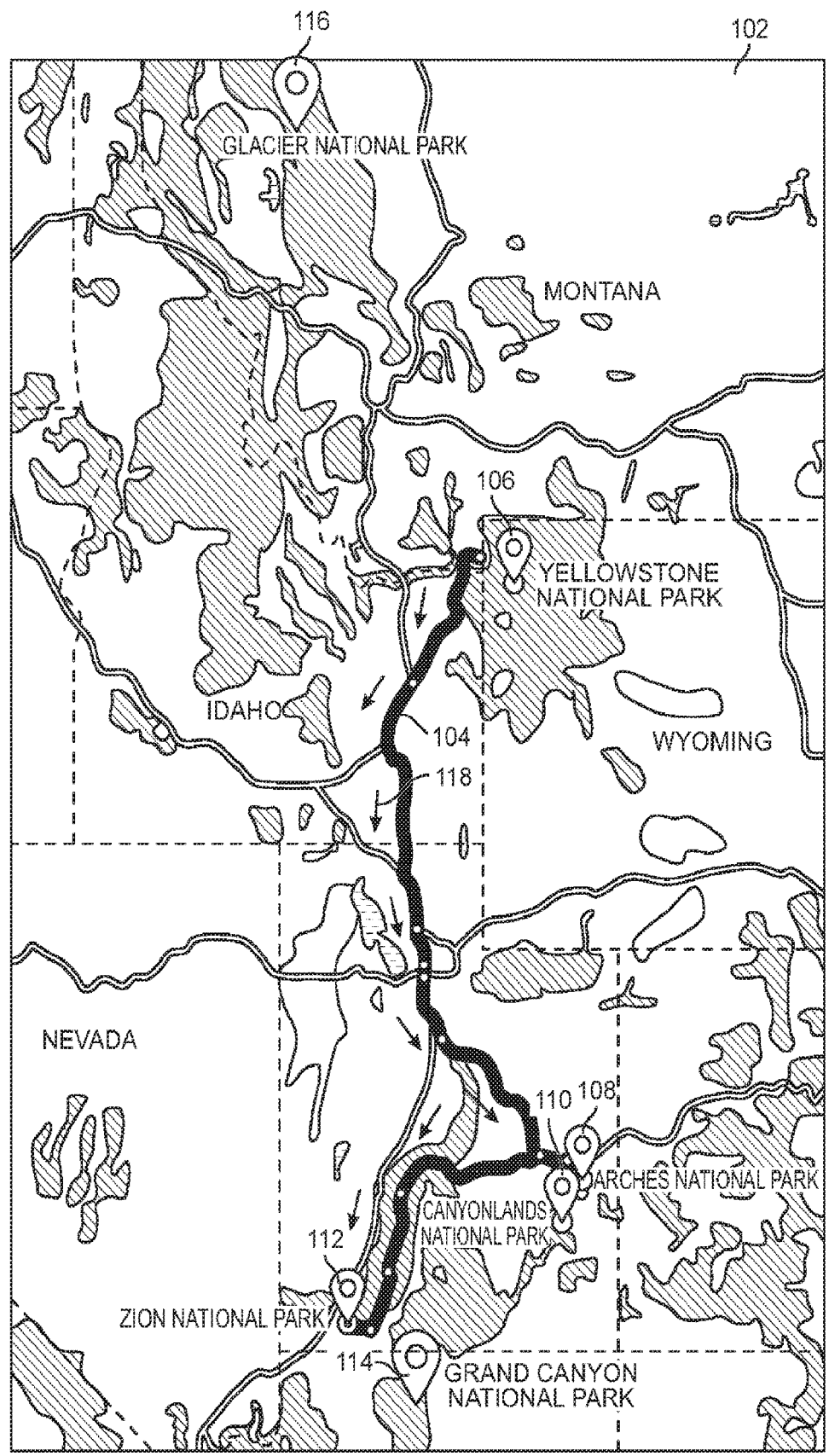
FIG. 1 is a diagram depicting a user travel path and available recommendation choices for next locations to visit according to embodiments of the present invention.

The term "historic user ratings" may refer to a set of values previously provided by a user. In some examples, historic user ratings can include ratings of items for multiple users. In some examples, historic user ratings can include non-binary numbers corresponding to a set of related items. Historic user ratings can be explicit data received from users pertaining to non-binary ratings or items.

The term "user-item preference matrix" may refer to a matrix that represents the relationship between a user and one or more items. In some examples, the user-item preference matrix can be a matrix that represents the relationship between multiple users and multiple items. In some examples, the user-item preference matrix can use the historic user ratings to determine and organize via matrix form the relationships between users and items. In some examples, values of the user-item preference matrix can be zero or have no value to represent that no user preference value has been observed or recorded, i.e., user preference values are missing from the user-item preference matrix because they do not yet exist.

The term "user preference values" may refer to values representing preferences of a user. The user preference values can be represented by the user-item preference matrix. In some examples, user preference values can be based on the historic user ratings.

The term "transition matrix" may refer to a square matrix used to describe the transitions of a Markov chain. The entries in a transition matrix can each be a nonnegative real number representing a probability. In some examples, values of the transition matrix can be zero or have no value to represent that no user transition data has been observed or recorded, i.e., transition values are missing from the transition matrix because they do not yet exist. In some examples, the transition matrix can be an asymmetric item-to-item transition matrix that captures aggregate user-item interaction sequences. The item-to-item transition matrix can be asymmetric, i.e., the number of users transitioning from item a to item b is different from the number of users transitioning from item b to item a. The transition matrix is meant to be different from item co-occurrence matrices that has been employed in other recommender systems [17, 18, 25]. For example, a transition matrix can describe the number of people visiting Louvre Museum (Paris) before Eiffel Tower (Paris), which is significantly more than the number of people visiting the two points of interest in reverse order. Embodiments can preserve the asymmetricity in transition during factorization and is likely to recommend Louvre before Eiffel Tower based on the transition matrix.

The term "factorize" may refer to resolve or having the ability to be resolvable into factors. For example, to factorize may consist of writing a number or another mathematical object as a product of several factors. In some examples, matrix factorization may also be referred to as matrix decomposition. For example, matrix factorizing is a factorization of a matrix into a product of matrices. In other examples, user-item preference matrix can be decomposed into two low-rank matrices, (e.g., user factor submatrix and item factor submatrix; the features associated with these low-rank matrices are user latent features and item latent features respectively. In some examples, the user factor and item factor submatrices may be referred to as affinity matrices. Some embodiments implement non-negative matrix factorization that can be constrained to decompose the user-item rating matrix into two non-negative low-rank matrices, known for working well on sparse incomplete data and facilitating result interpretability. The transition information based regularization can enable two items with a higher transition value between them to have similar latent factors in the item factor matrix. In certain embodiments, factorization can be Transition Regularized Non-Negative Matrix Factorization ("TRNMF").

The term "latent factors" may refer to factors that can be inferred as opposed to directly observable. In some examples, latent factors represent shared variance, or the degree to which certain factors correlate to one another. In the context of "latent user factors" and "latent item factors," the latent factors refer to factors pertaining to user and item data that is not immediately observable or easily recordable. Latent factors can be discovered when decomposing a user-item rating or preference matrix into two low-rank matrices, user factor submatrix and item factor submatrix, the features associated with these low-rank matrices are user latent features and item latent features respectively. In some examples, the user factor and item factor submatrices may be referred to as affinity matrices.

The term "cost function" may refer to a function that maps an event or values of one or more variables onto a real number intuitively representing some "cost" associated with the event. In some examples, a cost function may be referred to as a loss function. In some embodiments, it can be ideal to optimize an algorithm for purposes by minimizing the cost function.

The term "explicit feedback" may refer to feedback that is provided directly by a user. In some examples, explicit feedback can include non-binary user preferences corresponding to item ratings (i.e. higher values can indicate stronger preferences).

Implicit feedback may refer to feedback that is inferred from user behavior. In some examples, implicit feedback can include values corresponding to observations for user actions that indirectly indicate the preference for an item by a user (e.g., clicks, purchases, etc.). Implicit feedback can be binary, as opposed to explicit feedback which can be non-binary.

DETAILED DESCRIPTION

Various embodiments provide apparatuses, methods, and systems pertaining to the implementation of transition regularized non-negative matrix factorization for sequential recommendations. Embodiments can provide for sequential recommendation by leveraging users' preferences for items (e.g., user-item preference matrix), transitional interactions between items (e.g., item-item transition matrix), and user's current state (e.g., user's most recent user-item interaction) in order to recommend items that the user is expected to like next. Users' preference or rating data as well as item transition data pertaining to a specific set of related items can be used to develop a learning model. The learning model can be used to provide a user with an item within the set of related items based on the sequence of items the user has previously interacted with.

Embodiments allow for improved accuracy (i.e. providing a recommendation that a user would more likely be interested in or more likely interact with) in making sequential recommendations by forming new data structures. Using explicit user feedback as well as an asymmetric transition matrix can fill in the gaps of user data, allowing for more complete data sets from which to determine a recommendation from. This is especially useful when trying to make recommendations where little data exists. Embodiments can also analyze a most recent user-interacted item from a series of user-interacted items to determine a divergence from possible recommendations. The divergence determination can allow embodiments to further recommend more desirable, logical, or accurate recommendations by filtering possible recommendation choices based on the distance from the most recent item. The embodiments provides for new data structures and techniques to increase efficiency and quality of sequential recommendation solutions.

I. INTRODUCTION

The past decade has witnessed a significant progress in developing recommender systems that are personalized, diversified, scalable, online, interactive, trust-aware, context-aware, spatial, temporal, cold-start, etc. Recommendation literature describes algorithms that can be broadly categorized into collaborative-filtering based, content-based, and hybrid. Recent times have also seen isolated efforts in developing sequential recommendation approaches that consider users' sequential activity patterns in order to predict users' next actions. However, existing sequential recommendation methods suffer from many limitations such as: (1) modeling user preference and user sequential activity separately, (2) generating sequential recommendations without accounting for the most recent user-item interaction, (3) considering user-item interactions as binary/implicit observations only, (4) being application-specific, or (5) handling sparse data poorly such that predictive models are ineffective at learning from the available data.

Recommender systems are ubiquitous on the web today, and form an integral part of our daily lives. When users watch a movie, buy a product, or book a vacation, recommender systems make suggestions based on their and other users' past behavioral patterns. User behavior can include explicit item feedback in the form of ratings, tags, etc. as well as implicitly inferred feedback for items from web-based activities such as clicks, views, check-ins, etc. User behavior can also include movie-watching history, product-purchase history, etc., each of which happens in a sequential manner and has the potential to impact the next recommendation to be returned by a recommender system to the user. For example, it is meaningful to recommend the The Lord of the Rings movie The Two Towers (2002) to a user who has watched The Fellowship of the Ring (2001). Similarly, it is meaningful to recommend a tripod to a user who has bought a DSLR camera. In addition, the most recent user-item interaction is particularly critical for this kind of recommendation.

A. Limitations of Certain Techniques

Collaborative filtering uses the known preferences of a set of users towards a set of items to make recommendations or predictions on the unknown preferences for other users. One such conventional collaborative-filtering based method, Matrix Factorization [17] including its variant Non-negative Matrix Factorization [15], can consider explicit or implicit feedback and decompose the user-item preference matrix to discover the latent features underlying the interactions between users and items. The resulting recommendation is personalized, but ignores the sequential aspect of the user-item interactions. Markov-Chain based models capture transition relationships between pairs of items in a sequence [25]. A combination of Matrix Factorization and first-order Markov Chains can leverage both sequential behavior and users' general taste [23]. However, a major drawback of this method is that all the components are combined independently while they are inherently correlated.

Recurrent neural networks can be used for sequential recommendation purposes while handling user preferences and global sequential behavior jointly [3, 5]. However, these neural networks are difficult to design, train, and interpret. In addition, the need for large amounts of training data, which is a disadvantage of any neural net solution, makes neural networks impractical for many real world recommender applications involving sparse observable data.

Some frameworks (e.g., TransRec) can model third-order relationships between a user, the user's previously visited item(s), and the next item to consume for sequential prediction [9]. However, such models consider the entire user-item interaction sequence as the user's transition vector and do not account for the most recent user-item interaction, which can be critical for certain applications, as illustrated by FIG. 1. These models also assume triangular inequality which can puts two items close to a third item close to each other, which can negatively impact the recommendation output. Furthermore, such frameworks work only for implicit binary feedback that does not adequately captures users' preference for items.

Other related efforts focus on developing more application-specific solutions to the next item recommendation task [2, 22, 26], and fail to provide generalized recommendation solutions.

B. Use of Transition Matrix as Data Structure in Database for Recommendations Embodiments provide for a generic collaborative filtering based method, Transition Regularized Non-Negative Matrix Factorization ("TRNMF"), that returns personalized sequential recommendations to users. Unlike previous efforts, embodiments can recommend item(s) that users are expected to like next, model user preference and user sequential activity jointly, leverage the most recent user-item interaction state, incorporate asymmetric transition relationship between pairs of items, work on both implicit and explicit feedback datasets, and be independent of the application. Embodiments provide for a matrix factorization objective function that incorporates the asymmetry in itemto-item transition, the sequential recommendation effectiveness of which is empirically demonstrated in Section VI.

As previously explained, a major drawback of conventional methods implementing Matrix Factorization and first-order Markov Chains is that they treat the user preference component and the sequential activity component independently, which negatively affects the quality of the recommendation. Embodiments of the present invention can treat the two components jointly, which can improve the quality of recommendations, can model sequential user-item preferences with step-wise time span between successive events, and can recommend the set of items that a user is expected to like next, which is possible because it supports explicit user feedback for items.

Various embodiments can resolve all of the above-mentioned issues. Additionally, embodiments can not only recommend the next item to a user, but can also recommend a sequence of items. Given the historical sequence information of all user-item preferences and a user's current state (e.g., most recent user-item), the a number of top relevant new items returned by TRNMF can form a meaningful sequence. For applications where the most recent user state plays a vital role in what a user may do next, TRNMF can be iteratively executed to recommend a sequence of items to the user.

C. Use Example

FIG. 1 depicts a user travel path and some available recommendation choices for next locations to visit according to one example. The example depicted is being used to describe a situation in which a user interacts with a sequence of items (e.g., visits or rates tourist locations), has last interacted with a most recent item, and is seeking a recommendation of a next item (e.g., next logical tourist location) that the user has not yet interacted with.

The user recommendation scenario in FIG. 1 depicts a plan view 102 of a geological map including a user path 104. The user path 104 can include visited locations 106, 108, 110, and 112. The plan view 102 can also include possible recommended locations 114 and 116. In this example, a user can take a National Parks road-trip along user path 104 and visit Yellowstone National Park (106), Arches National Park (108), Canyonlands National Park (110), and Zion National Park (112) in a sequence. The user can travel along user path 104 to each visited locations 106, 108, 110, and 112 in a specific order as depicted by the user trajectory 118.

After interacting with the sequence of visited locations 106, 108, 110, and 112, the user can request the recommender system to provide a next logical location to visit based on a combination of which items the user has interacted with, the last item the user interacted with, and any ratings or preference data provided by both the user and other users. In this example, the last user-item interaction occurred at last visited location 112, Zion National Park. Available possible recommended locations 114 and 116 can be Grand Canyon National Park and Glacier National Park respectively. Because the user has travelled along user path 104 in a southbound user trajectory 118, and the user last visited location 106, it would be pertinent for the recommender system to recommend a next location that is both close to the last visited location 106 and generally in the same southbound 118 trajectory so as to prevent backtracking on the user path 104.

The possible recommended locations 114 and 116 can be analyzed and given a score in relation to users' rating and visiting sequences for all visited locations 106, 108, 110, and 112 and possible recommended locations 114 and 116, and the last visited location 112. Because location 114 is closer to visited location 112 than location 116, and is in the general trajectory of user path 104 where location 116 is not, location 114 can be assigned a higher score and location 116 can be assigned a lower score. As such, the recommender system can recommend to the user visiting location 114 as opposed to location 116. Other examples may include multiple other available items to recommend, and may not be limited to choosing between two items to recommend.

The sequential recommender system using transition regularized matrix factorization disclosed herein seeks to provide solutions for these examples and other problems encountered when attempting to determine logical sequential recommendations of items for a user to consume or interact with.

II. RECOMMENDATIONS OF ITEMS TO USERS

Figure 2:
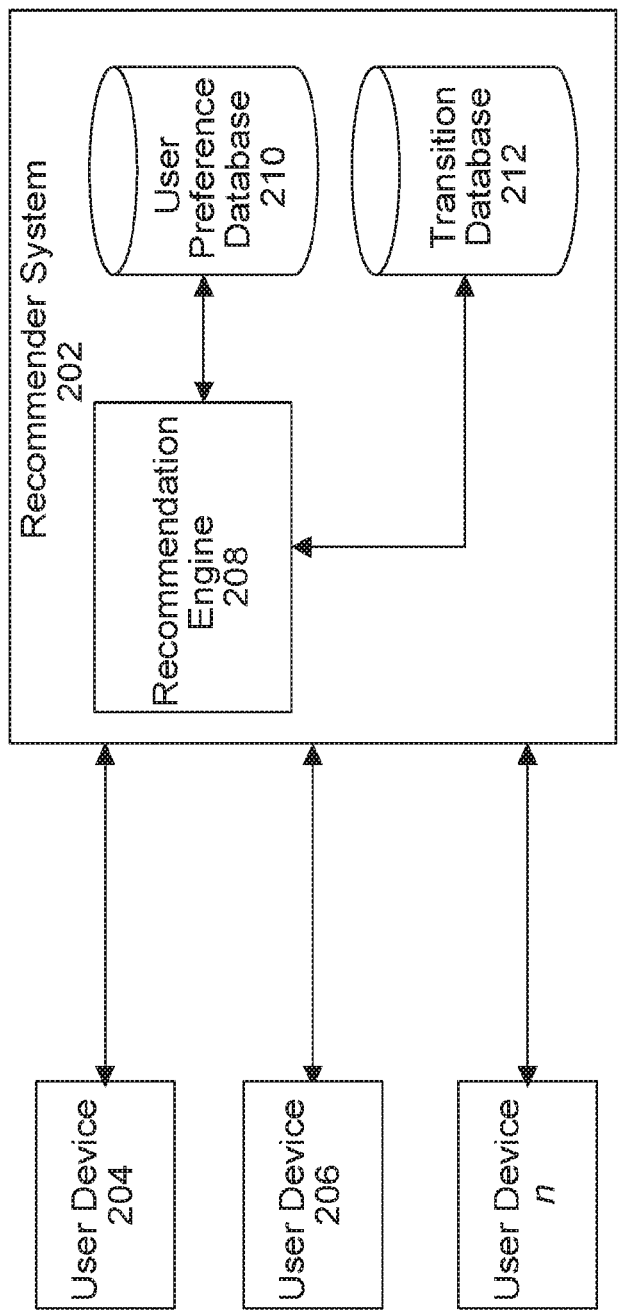
FIG. 2 is a contextual diagram of a recommender system connected to a number of user devices according to embodiments.

FIG. 2 depicts a contextual diagram of a recommender system connected to a number of user devices according to one example. The recommender system 202 can be communicatively coupled to user devices 204, 206, . . . n, where n represents any further number of user devices. The recommender system 202 can include a recommendation engine 208, a user preference database 210, a transition database 212, and any other components necessary to communicate with multiple user devices and to provide sequential recommendations. The recommender system can be communicatively coupled to one or more user devices using any conventional methods (e.g., communication port, network interface, etc.)

The user devices 204, 206, . . . n can each transmit one or more requests for sequential recommendations of various types of items to the recommender system 202. For example, the user device 204 can transmit to the recommender system 202 a request for a recommended movie to watch based on the last movie watched, user device 206 can transmit to the recommender system 202 a request for a next museum for a user to visit, and another user device of user devices n can transmit to the recommender system 202 a request for a sequence of related products after purchasing one product. The recommender system 202, in response to each request for recommendation from any user devices 204, 206, . . . n, can determine an item from a set of related items to recommend (i.e. the recommended item is of the same item type as the set of related items), and then transmit the recommendation to each respective requesting user device. Thus, there can exist multiple sets of related items where one set of related items can be a different item type as compared to another set of related items.

The recommender system 202 can retrieve user preference data, e.g., ratings of items, from the user devices 204, 206, . . . n, and store the user preference data in user preference database 210. The recommender system 202 can retrieve user transition data, i.e. the sequence of items a user interacts with including a most recent user-interacted item, from the user devices 204, 206, . . . n, and store the user preference data in transition database 212. In some examples, retrieving preference data and transition data from the user devices 204, 206, . . . n can be performed automatically when each user device receives an input from a user. For example, the user of user device 204 can rate a movie, and the rating can be automatically transmitted to the recommender system 202 via the user device 204 for processing without additional input from user. In another example, the user device 206 can record that a user has visited a second museum after visiting a first museum, and can automatically transmit the transition data to the recommender system 202 without input from user. In other examples, the recommender system 202 can retrieve user preference data and transition data from the user devices 204, 206, . . . n, when a user device makes a request for a recommendation, the request including the user's preference data and transition data for a specific item or set of items.

The recommendation engine 208 can perform any of the functions described by various embodiments of this disclosure for performing transition regularized non-negative matrix factorization and providing sequential recommendations. The recommendation engine 208 can retrieve the user preference data and user transition data from the user preference database 210 and the transition database 212 respectively for purposes of performing any of the functions of the disclosed embodiments. The recommendation engine 208 can use the user preference data to generate a user-item preference matrix, which can be stored in and retrieved from the user preference database 210. The recommendation engine 208 can use the transition data to generate a transition matrix, which can be stored in and retrieved from the transition database 212.

The recommendation engine 208 can determine an estimated user-item preference matrix using the data (e.g., user preference matrix, transition matrix) from the user preference database 210 and transition database 212. The recommendation engine 208 can then store the estimated user-item preference matrix in the user preference database 210 for use in subsequent recommendation requests. The recommendation engine 208 can update the estimated user-item preference matrix in the user preference database 210 after receiving new user preference and transition data for a user or multiple users.

The user preference database 210 can compartmentalize preference values and corresponding user-item preference matrices for sets of related items of different item types, e.g., user values and matrices for movies of one genre are stored separately from user values and matrices for movies of a different genre. The transition database 212 can similarly compartmentalize user data and transition matrices corresponding to different sets of related items.

In some examples, the user preference database 210 and transition database 212 can be a single database that can store all relevant user information required for providing sequential recommendations. In some examples, user preference values and transition data can be stored remotely, such that the recommender system 202 can request the necessary information (e.g., from another system that it is communicatively coupled to the recommender system 202). In some examples, the remote systems storing the user information can be a number of user devices in a cloud computing configuration, such that information is spread across multiple devices. In other examples, the recommender system 202 can be built into user devices 204, 206, . . . n, which may make the process of providing a recommendation more efficient.

Figure 3:
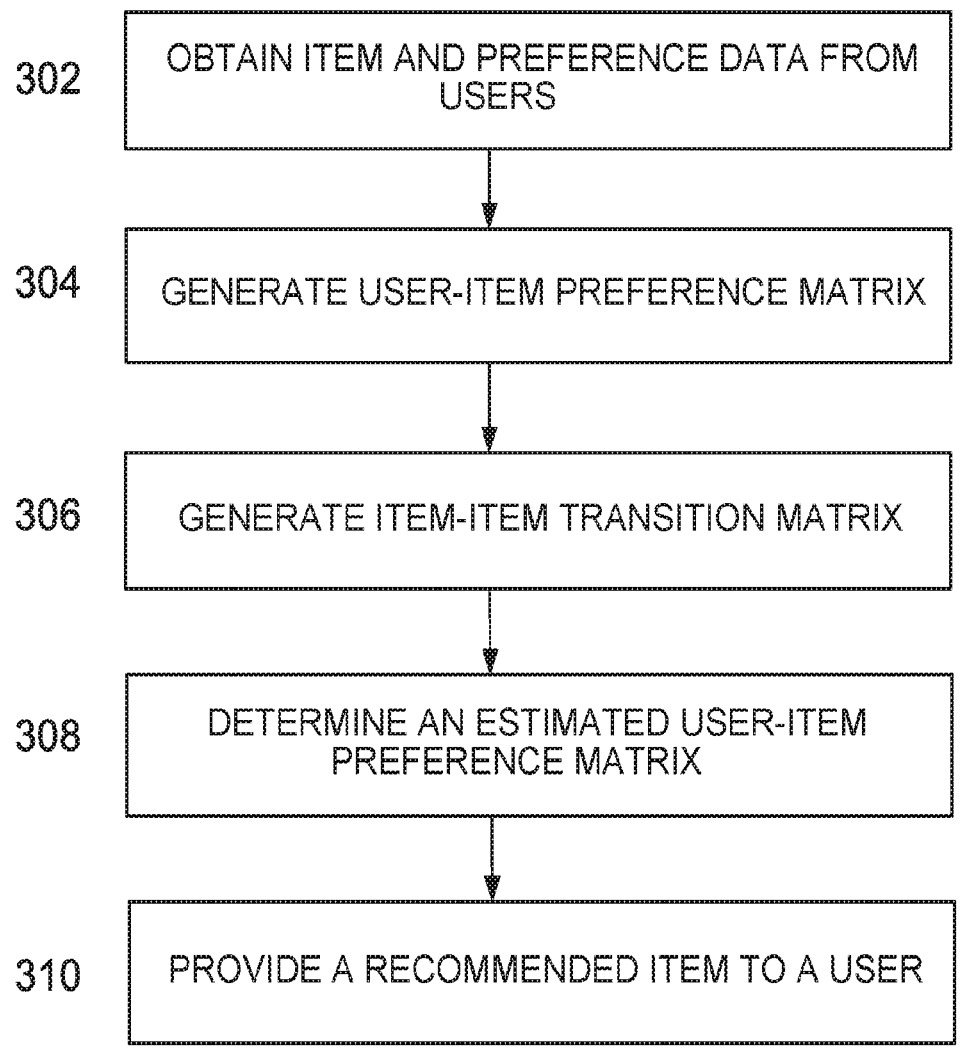
FIG. 3 is a flowchart describing sequential recommendations using transition regularized matrix factorization according to embodiments of the present invention.

FIG. 3 depicts a flowchart illustrating the basic processes with components for proving sequential recommendations using TRNMF.

At block 302, item and preference data from users can be obtained for purposes of generating a user-item preference matrix and transition matrix. This data can include both implicit and explicit data from multiple users and separately include implicit and explicit data of the user requesting a recommendation. The data can corresponds to any number or logically related items.

At block 304, a user-item preference matrix can be generated using the user data determined at block 302. In some examples, the user-item preference matrix can be a matrix that represents the relationship between multiple users and multiple items. The user-item preference matrix can use the item and preference data at block 302 (e.g., historic user ratings) to determine and organize, via matrix form, the relationships between users and items.

Figure 4:
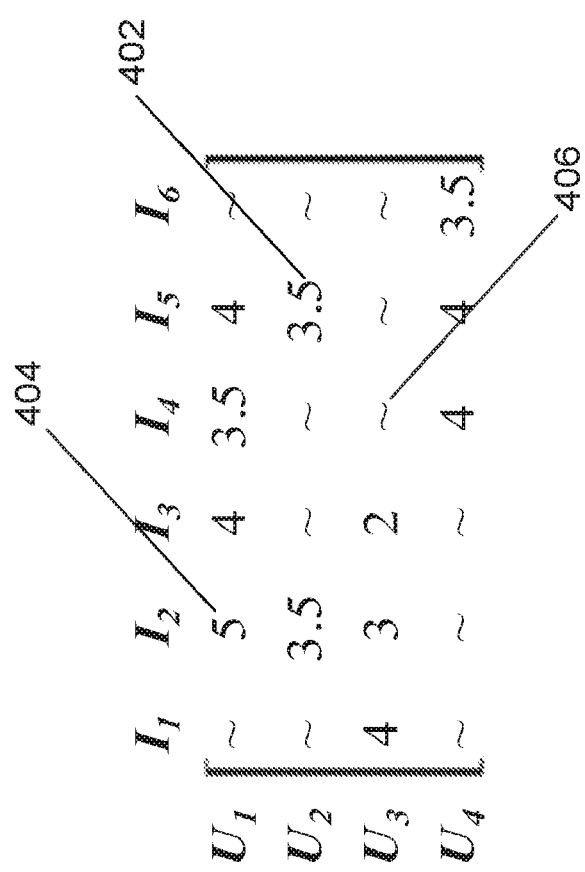
FIG. 4 is a user-item preference matrix according to embodiments.

FIG. 4 depicts an example of a user-item preference matrix. The columns of the user-item preference matrix can represent each item in a set of related items ($I_1, I_2, \ldots I_n$), and the rows can represent each user ($U_1, U_2, \ldots U_n$) who has given at least one rating for any of the items in the set of related items. Each matrix address location can represent a preference value or rating that a specific user has given a specific item of the set of related items. For example, at matrix address location 402, user $U_2$ has given item $I_5$ a rating value of 3.5. In some examples, the user-item preference matrix may have no rating value for an item by a user (e.g., matrix address location 406). Absence of a value corresponding to a rating by a user for an item can represent that the user has not yet given a rating for that item. The preference value stored in the user-item preference matrix can implement any appropriate scaling method or rating system to distinguish preferences values. For example, the rating system can implement a scaling out of a value of five, where a value of 5 out of 5 at matrix address location 404 can represent a perfect rating and a value of 3.5 out of 5 at matrix address location 402 can represent a slightly above average rating.

At block 306, an item-item transition matrix, corresponding to the transitions of multiple users from each paired combination of items, can be generated. In some examples, the transition matrix can be an item-to-item transition matrix that captures aggregate user-item interaction sequences. The item-to-item transition matrix can be asymmetric, i.e., the number of users transitioning from a first item to a second item is different from the number of users transitioning from second item to the first item. FIG. 5 depicts an example of an item-item transition matrix including data points corresponding to users' transitional data between items. The values at each intersection of column and row identifiers ($I_1, I_2, \ldots I_n$) can represent the number of users who transition from one item to another.

Figure 6:
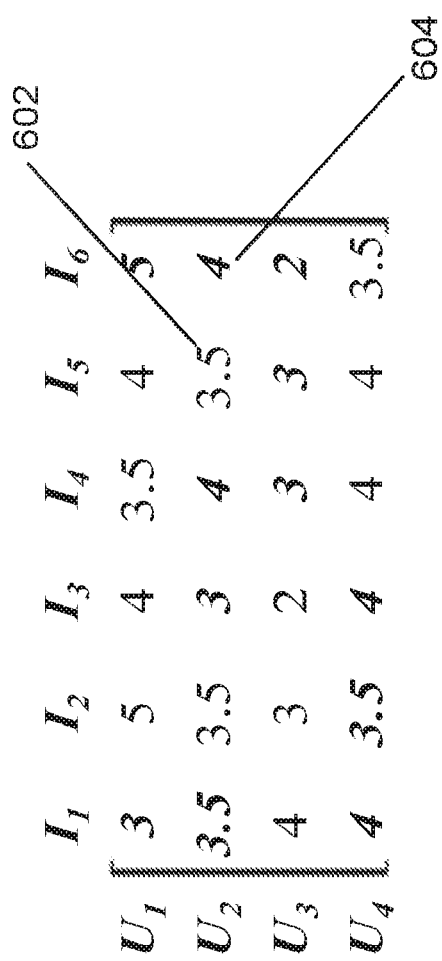
FIG. 6 is an estimated user-item preference matrix according to embodiments.

At block 308, an estimated user-item preference matrix can be generated and used to determine missing ratings values of users. FIG. 6 depicts an example of an estimated user-item preference matrix. In some examples, the item and preference data may be incomplete such that the requesting user may not have ratings for each item of the logically related items. In this scenario, which would likely be the norm, the user-item preference matrix may lack information to produce an accurate and logical recommendation to the user. As such, one purpose of various embodiments is to predict the likely values of the user data that were originally absent. The estimated user-item preference matrix can be determined using a non-negative user factor submatrix and non-negative item factor submatrix, which are the results of applying the transition matrix to the decomposition of the user-item preference matrix.

The columns of the estimated user-item preference matrix can represent each item is a set of related items ($I_1, I_2, \ldots I_n$), and the rows can represent each user ($U_1, U_2, \ldots U_n$) who has given at least one rating for any of the items in the set of related items. Each matrix address location can represent either (i) a preference value or rating that a specific user has explicitly given a specific item of the set of related items, or (ii) an estimated preference value or rating that a user would be expected to give to a specific item of the set of related items. The estimated preference value may match the exact preference value or is likely very close to the input by a user in the user-item preference matrix. For example, at matrix address location 602, user $U_2$ has given item $I_5$ a rating value of 3.5, which was previously stored in the user-item preference matrix at matrix address location 404 of FIG. 4. At matrix address location 604, an estimated preference value of 4 has been determined for the item $I_6$ for the user $U_2$ where the value was not given by the user $U_2$. In some examples, an estimated user-item preference matrix can be updated to reflect a change in the user-item preference matrix. For example, if the user $U_2$ were to give a rating of 2.5 for the item $I_6$, the user-item preference matrix would reflect this change, and then update the estimated user-item preference matrix accordingly to change the value of the matrix address location 604 from a 4 to a 2.5. This allows the estimated user-item preference matrix to be updated and provide for more accurate ratings estimations as more user data is gathered.

At block 310, a user can be provided with a recommended item from the series of related items. A next best logical item to recommend can be determined by scoring the items available to the user. The scoring can be performed by using the estimated user-item preference matrix and a loss function that determines a distance in the transition matrix (e.g., transition regularization penalty) between each item and the user's sequence of interacted items. The item with the highest score can then be recommended to the user.

III. INITIALIZATION OF MATRICES

In this section, descriptions of various components used to perform sequential recommendations using TRNMF are provided. The components can include an item-item transition matrix and user-item preference matrix. The following Table 1: Notations includes descriptions for variables used in TRNMF for sequential recommendations.

TABLE 1

Notations

| Notation | Explanation |
|---|---|
| U, I | set of users, set of items |
| M, N | number of users, number of items |
| $U_i$, $I_j$ | $i^{th}$ user in U, $j^{th}$ item in I |
| R, $\hat{R}$ | input user-item preference matrix, estimated approximate user-item preference matrix |
| $R_{ij}$, $\hat{R}_{ij}$ | input preference for $I_j$ by $U_i$, estimated preference for $I_j$ by $U_i$ |
| X, Y, D | user factor matrix, item factor matrix, dimensionality of latent factor |
| $V^i$, $I^i$, $t^i$ | preference sequence of $U_i$, item sequence of $U_i$, timestamp sequence of $U_i$ |
| $V_k^i \rightarrow V_j^i$ | $U_i$ interacted with $I_k$ before $I_j$ |
| $V^U$ | historical preference sequence of all users in U |
| l, n | length of sequence of $U_i$, length of recommended sequence for $U_i$ |
| $t_l^i$, $I_l^i$ | current timestamp, item with which $U_i$ interacted in current/most recent state |
| $t_l^i$, $t_l^i + i$ | current timestamp, next timestamp in sequence for $U_i$ |
| T, $T_{kj}$ | transition matrix, total number of users who interacted with $I_k$ right before $I_j$ |
| w, $T_{kj}^w$ | temporal sliding window width, total number of users who interacted with $I_k$ before $I_j$ within w steps |
| $X_i$, $X_{id}$ | latent factor for $U_i$, latent factor value along dimension $d \in D$ for $U_i$ |
| $Y_j$, $Y_{jd}$ | latent factor for $I_j$, latent factor value along dimension $d \in D$ for $I_j$ |

TABLE 1-continued

Notations

| Notation | Explanation |
|---|---|
| α, β | hyper-parameter for L2 regularization, hyper-parameter for transition regularization, next item recommendation |
| γ, η | hyper-parameter for next new item recommendation, hyper-parameter for gradient descent learning |

A. User-Item Interactions and User-Item Preference Matrix

User data can be organized to illustrate the relationships between a user and the order in which they interact with various related items. Aggregating this user-item interaction data from multiple users can indicate a common pattern for how typical users would interact with a series of related items. Determining a common pattern for user-item interactions is essential for recommendation purposes.

Let $U=\{U_1, U_2, \ldots, U_M\}$ be a set of M users, and $I=\{I_1, I_2, \ldots, I_N\}$ be a set of N items. Users in U can interact with items in I. The interactions can either be explicit where values are numeric ratings that indicate the preference for an item by a user (higher values indicate stronger preferences), or implicit where values are observations for user-actions that indirectly indicate the preference for an item by a user. Some embodiments can use positive explicit feedback in determining an item to recommend. Let R represent the user-item preference matrix where $R_{ij}$ is the explicit feedback for item $I_j$ by user $U_i$, $R_{ij} \in \mathbb{R}_+^{M \times N}$. Note that explicit ratings are typically unknown for the vast majority of user-item pairs, i.e., R is extremely sparse. Thus, embodiments seek to "fill in" data in the user-item preference matrix, R, by developing an estimated user-item preference matrix, $\hat{R}$, based on the item-item transition matrix, T.

For each user $U_i \in U$, there can be a sequence of user-item interactions, i.e. preferences for items, represented by $V^i=\{V_{j_1}^i \rightarrow V_{j_2}^i \rightarrow \ldots \rightarrow V_{j_l}^i\}$ where $I^i=\{I_{j_1}, I_{j_2}, \ldots, I_{j_l}\} \in I$ is the sequence of items rated by user $U_i$. Note that, $V_j^i$ is $R_{ij}$, i.e., preference for $I_j$ by user $U_i$. Each observation in $V^i$ is associated with corresponding timestamps $t_i=\{t_{j_1}^i, t_{j_2}^i, \ldots t_{j_l}^i\}$. $V_k^i \rightarrow V_j^i$ can indicate that $U_i$ interacted with item $I_k$ before item $I_j$. The sequence history of all users in U can be represented by $V^U=\{V^1, V^2, \ldots V^M\}$. A next new item or set of items can be recommended to a user based on the historical sequence information for all user-item preferences and a user's current user-item state, (e.g., most recent user-item preference).

Given historical sequence information of all users $V^U$ that includes user $U_i$'s sequence $V^i=\{V_{j_1}^i \rightarrow V_{j_2}^i \rightarrow \ldots \rightarrow V_{j_l}^i\}$ and given user $U_i$'s current/most recent state is $V_{j_l}^i$ at time $t_l^i$, the goal of sequential recommendation is to recommend to user $U_i$ items from $\{I-I^i\}$ at $t_{l+1}^i$ that she is expected to like the most. Thus, the item recommendation task for user $U_1$ at time $t_{l+1}^i$ can be interpreted as creating a personal ranking over items in $\{I-I^i\}$.

Embodiments can recommend items to a user in a sequence, i.e., for time $t_{l+1}, t_{l+2}, t_{l+3}, \ldots, t_{l+k}$ etc. where a user's overall sequence history up to $t_l$ and the user's current state at time $t_l$ are leveraged to generate the length n sequence. Embodiments can also generate the length n sequence by executing the proposed methodology k times where the user's current state is updated each of the k times.

B. Transition Matrix

This section introduces the concept of transition matrix that captures the aggregate user-item interactions and is critical to for making sequential recommendations using TRNMF.

Let T denote the N×N transition matrix for the N items in I such that $T_{kj}$ is the aggregate of all users who interacted with item $I_j$ after $I_k$.

$$T_{kj} = \sum_{U_i \in U} V_k^i \to V_j^i \quad (1)$$

$V_k^i \to V_j^i$ can indicate that user $U_i$ interacted with $I_k$ before $I_j$. With respect to the user-item preference matrix R, if $R_{ik}$ is user $U_i$'s preference for item $I_k$ at time $t_k^i$ and $R_{ij}$ is user $U_i$ preference for item $I_j$ at time $t_j^i$, and if $\{t_k^i - t_k^i\} = 1$, then it can contribute to the aggregation in $T_{kj}$.

Figure 7:
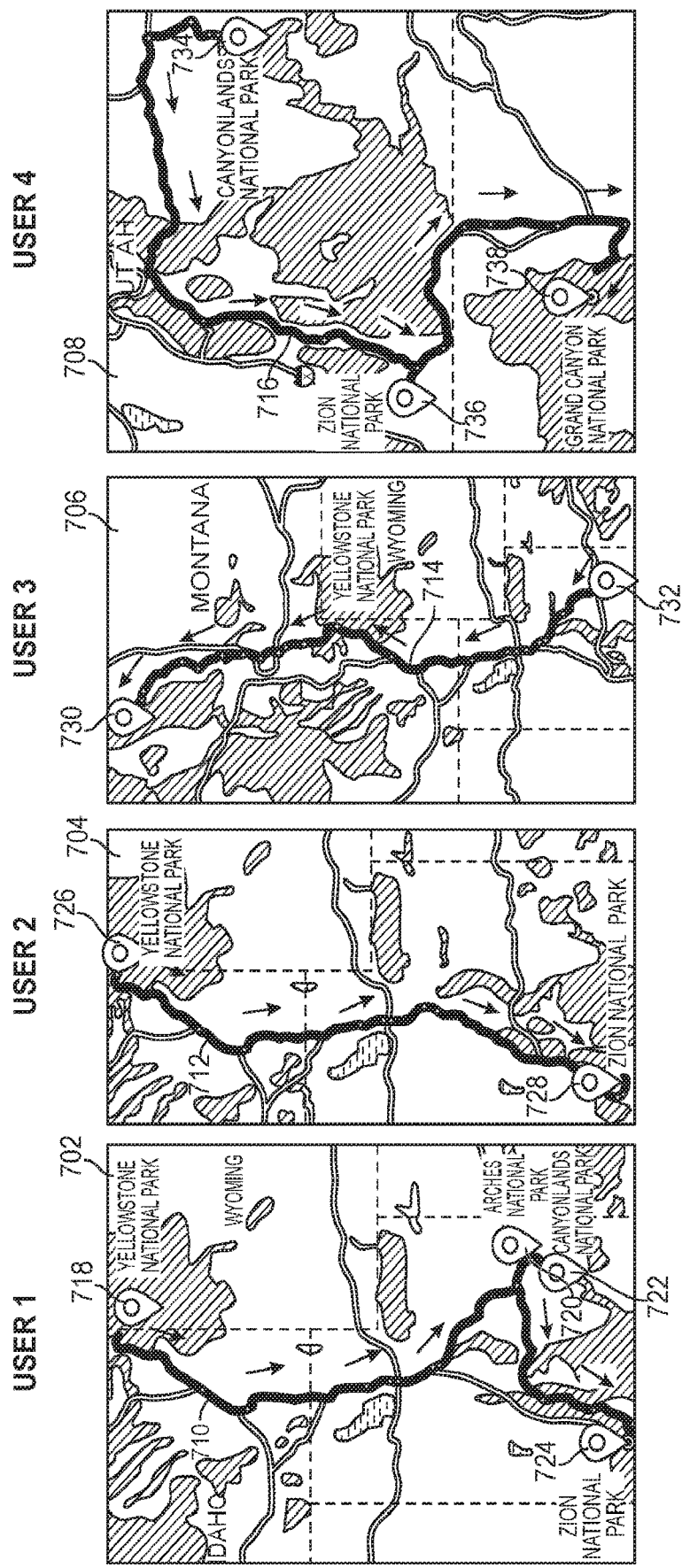
FIG. 7 is a diagram depicting user-item interactions for multiple users in the form of road-trip sequences according to embodiments of the present invention.

FIG. 7 depicts user-item interactions for multiple users in the form of road-trip sequences according to one example. The user-item interactions shown can be aggregated to produce a single item-item transition matrix that describes user-item relationships for multiple users for a set of related items. In this example, four users journey to various national parks in different orders and directions. User 1's trip 710, shown in plan view 702, begins at location 718 and proceeds southbound through to locations 720, 722, and 724 respectively. User 2's trip 712, shown in plan view 704, begins at location 726 and proceeds southbound to location 728. User 3's trip 714, shown in plan view 706, begins at location 732 and proceeds northbound to location 730. User 4's trip 716, shown in plan view 708, begins at location 734 and proceeds southbound through to locations 736 and 738 respectively. The order locations visited along each trip 710, 712, 714, 716 can be translated into an item-item transition matrix that can represent in non-binary numbers the total number of times a user interacted with a set of two items in any order.

Considering the example illustrated in FIG. 1, let items $I_1$=Glacier National Park, $I_2$=Yellowstone National Park, $I_3$=Arches National Park, $I_4$=Canyonlands National Park, $I_5$=Zion National Park, and $I_6$=Grand Canyon National Park. Let user $U_1$ sequence: $\{I_2 \to I_3 \to I_4 \to I_5\}$, $U_2$ sequence: $\{I_2 \to I_5\}$, $U_3$ sequence: $\{I_3 \to I_2 \to I_1\}$, and $U_4$ sequence: $\{I_4 \to I_5 \to I_6\}$. The item-to-item transition matrix for the example in FIG. 7 is shown in FIG. 5.

As shown in FIG. 5, because Users 1 and 4 both transitioned from Canyonlands National Park to Zion National Park (722 to 724, 734 to 736), a value of 2 is shown in the item-item transition matrix corresponding to $I_4 \to I_5$ (matrix address location 502). If User 4 had driven northbound and instead visited location 336 (Zion National Park) prior to visiting location 334 (Canyonlands National Park), the transition matrix would show a value of 1 corresponding to $I_4 \to I_5$ instead of 2, and a value of 1 corresponding to $I_5 \to I_4$ instead of 0 (matrix address location 504).

In some examples, ratings for items may be equivalent after determining an estimated user-item preference matrix. Application of the item-item transition matrix in the TRNMF process can allow for determination of which of the items with tied ratings should be recommended to the user. For example, in view of FIG. 7, Glacier National Park and Zion National Park may both have an estimated rating of 4.9. Assuming the user has last interacted with visited location 110, Canyonlands National Park, the next recommended location will be Zion National Park, despite the fact that both park choices are "liked" by users equally. This recommendation would be made because the number of people travelling from $I_4 \to I_5$, 2 users.

The transition matrix can be generalized over a width w such that $T_{kj}$ is the aggregate of all users who interacted with item $I_k$ before $I_j$ within a temporal sliding window of width w. In other words, $\{t_j^i - t_k^i\} \le w$. This is because transition from one item to another over a single step, i.e., w=1, may miss some of the rich sequential information that is otherwise available for consideration. For example, a traveler may visit Eiffel Tower (Paris) right after visiting Louvre Museum (Paris), i.e., w=1, or via Arc de Triomphe, i.e., w=2. The second sequence continues to embed the information that people visit Louvre before Eiffel Tower and is useful to aggregate in the transition matrix. w can be a hyper-parameter as shown by the experiments in Section VI. Formally, $$T_{kj}^w = \sum_{U_i \in U} \{V_k^i \to \ldots \to V_j^i\}, \text{ where } (t_j^i - t_k^i) \le w. \quad (2)$$

The transition matrix can be a hollow matrix, i.e., a square matrix whose diagonal elements are all equal to zero since $T_{kk}=0$. In addition, the transition matrix is an asymmetric matrix since $T_{kj} \ne T_{jk}$. In the experiments in Section VI, the transition matrix is column-normalized.

IV. TRANSITION REGULARIZED NON-NEGATIVE MATRIX FACTORIZATION

This section describes how the estimated user-item preference matrix can be determined through TRNMF of the user-item preference using the item-item transition matrix. Using explicit user feedback and an asymmetric item-item transition matrix when factorizing to determine latent factors can allow for the generation of new data structures, i.e. an estimated user-item preference matrix, which can fill in the gaps of missing user preference data. Filling in the gaps of user data can allow for more accurate and efficient implementations of sequential recommendations. The estimated user-item preference matrix can, in addition to being used for sequential recommendations, be useful as an independent data set for data analytics and other predictive applications leveraging multiple users' data.

Figure 8:
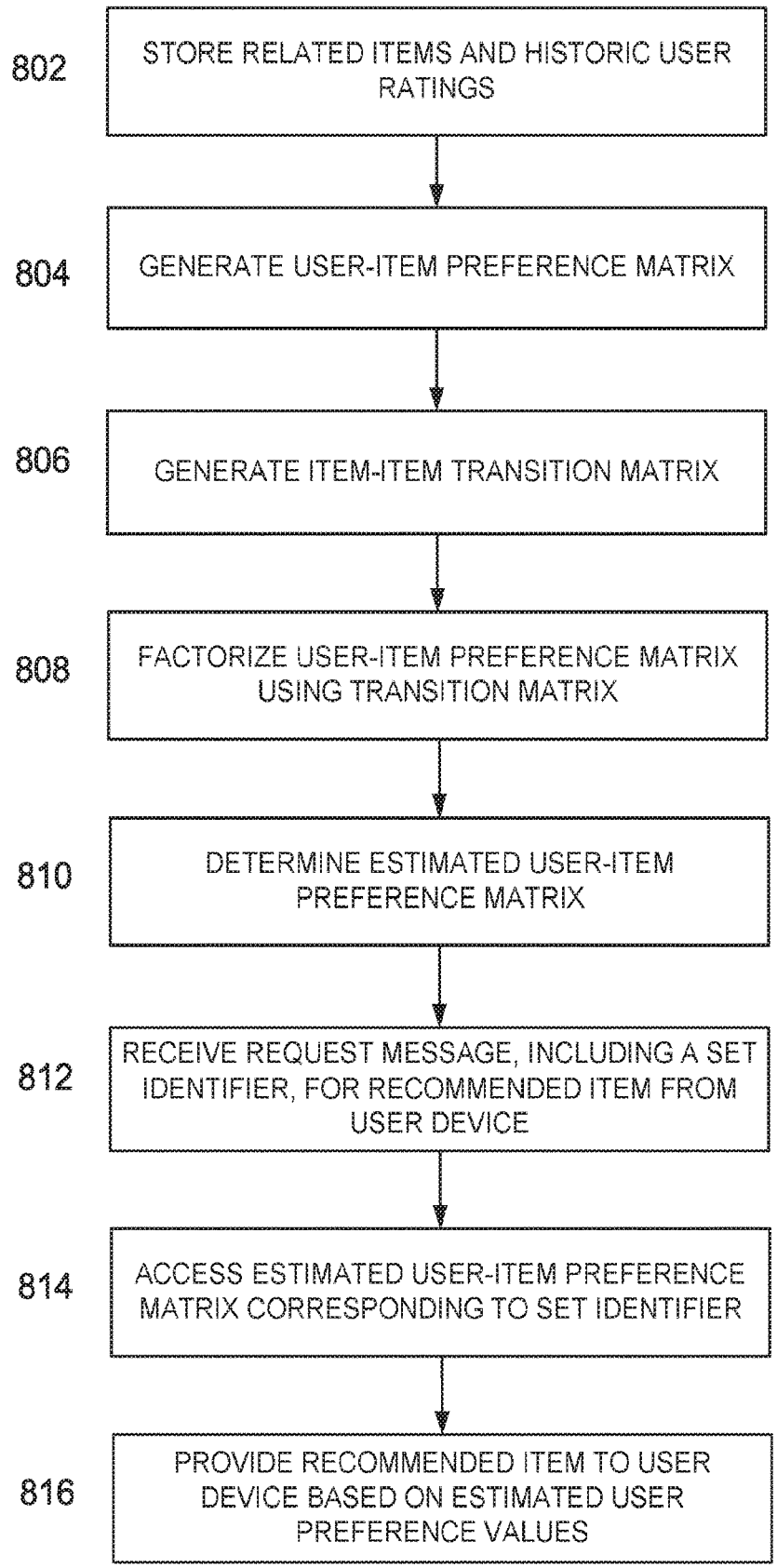
FIG. 8 is a flowchart of a method for using transition regularized matrix factorization to determine an estimated user-item preference matrix according to embodiments of the present invention.

FIG. 8 depicts a flowchart of a method for using transition regularized matrix factorization to determine an estimated user-item preference matrix according to one example.

At block 802, a set of related items as well as a set of historic user ratings is stored in a database of a computer system in preparation for developing the necessary matrices components for TRNMF. The set of historic user ratings can be non-binary numbers corresponding to the set of related items. The set of related items can be any number of logically related items. The set of related items with corresponding historic user ratings can be for a group of users. The historic user ratings can include item ratings for multiple users aggregated as a single rating per item, and separately include item ratings for a single user for any item from the set of related items. The set of related items can be stored in association with a set identifier for use in identifying a message from a user as corresponding to the set of related items. The database in which the set of related items and historic users ratings are stored can be missing historic user ratings for at least some of the group of users for at least some of the set of related items. For example, one or more items from each of one or more sets of related items can be stored in the database without having any user ratings or preference data. Embodiments provide for new data structures to estimate the missing data points.

At block 804, the user-item preference matrix is generated according to any of the previously described examples. The user-item preference matrix can include user preference values for items of the set of related items based on the set of historic user ratings. In some examples, the user-item preference matrix can be missing user preference values corresponding to missing historic user ratings, i.e. elements of the user-item preference matrix will have zero or no value when there exist no user ratings for various items. Multiple user-item preference matrices can be generated, each corresponding to different sets of related items. For example, a user-item preference matrix can be generated for action movies and a separate user-item preference matrix can be generated for art gallery locations in a city.

At block 806, an item-item transition matrix is generated according to any of the previously described examples. The transition can be generated by aggregating a total number of users transitioning between paired combinations of items. Values of the item-item transition matrix can represent the number of users transitioning from one item from a set of related items to another item in the same set of related items. The item-item transition matrix can have values of zero or no value where no user has transitioned from one item to another item. Multiple item-item transition matrices can be generated, each corresponding to different sets of related items. For example, an item-item transition matrix can be generated for action movies and a separate item-item preference matrix can be generated for art gallery locations in a city.

At block 808, the user-item preference matrix is factorized, or decomposed, using the item-item transition matrix. The result of the TRNMF of the user-item preference matrix is (a) a non-negative user factor submatrix representing latent user factors and (b) a non-negative item factor submatrix representing latent item factors. The non-negative user factor submatrix (e.g., user affinity matrix) can represent latent user factors or features which can correspond to missing historic user ratings. The dimensions of the user factor submatrix can be the number of users, M, and the latent factor dimension, D (e.g., M×D). The non-negative item factor submatrix (e.g., item affinity matrix) can represent latent item factors or features. The dimensions of the item factor submatrix can be the latent factor dimension, D, and the number of items, N (e.g., D×N). Paired combinations of items having a higher transition value can have similar latent item factors. A high transition value between a pair of items can enforce their corresponding latent factors to be similar, which can correspond to similar ratings for the pair of items, which in turn can enforce the two items to be close to each other in the ranked output. Higher latent item factors between paired combinations of items can correspond to an increased probability that a user will transition from a first item of the paired combination of items to a second item of the paired combination of items. Lower latent item factors between paired combinations can correspond to a decreased probability that a user will transition from a first item of the paired combination of items to a second item of the paired combination of items as compared to paired combinations having higher latent item factors. The TRNMF can include an optimization of a cost or loss function that includes a transition regularization penalty. The transition regularization penalty can include a divergence value for distances between paired combinations of items in the transition matrix.

The non-negative user and item submatrices, or low-rank matrices, can be determined by a number of methods. One such method can be traditional collaborative filtering approaches based on low-dimensional factor models. The regularized SVD method can factorize the user-item preference matrix into a product of two low-rank matrices that can be used to estimate the missing entries [14]. An alternate approach, Non-Negative Matrix Factorization (NMF), can constrain the low-rank matrices forming the factorization to have non-negative entries, which ensures good representativeness of the learnt model [16, 28].

Given user-item preference matrix $R \in \mathbb{R}_+^{M \times N}$ and item-item transition matrix $T \in \mathbb{R}_+^{N \times N}$ for users in U interacting with items in I, two low-rank non-negative matrices $X \in \mathbb{R}_+^{M \times D}$ and $Y \in \mathbb{R}_+^{D \times N}$ subject to a loss function minimization can be determined. The loss function can have three components:

Loss between original matrix and estimated matrix $\mathcal{L}_\varepsilon(R, \hat{R})$ where $\hat{R} = f(X, Y)$ Asymmetric transition regularization penalty $\mathcal{L}_\mathcal{T}(X, Y)$ Regularization penalty to avoid overfitting $\mathcal{L}_\mathcal{R}(X, Y)$.

Types of cost functions that can quantify the quality of approximation, i.e, $\mathcal{L}_\varepsilon(R, \hat{R})$ include (i) squaring the Euclidean distance between two matrices, and (ii) measuring the divergence between two matrices [16]. Without any loss of generality, consider the former that is the square of the Frobenius norm of two matrices difference.

$$\mathcal{L}_E(R, \hat{R}) = \|R - \hat{R}\|^2 = \sum_{i,j} \left( R_{ij} - \sum_{d=1}^{D} X_{id} \cdot Y_{jd} \right) \quad (3)$$

The second component of the loss function is the transition regularization that intends to control items $I_k$ and $I_j$ latent factors $Y_k$ and $Y_j$ respectively so that they are close to each other if there is a higher transition value between $I_k$ and $I_j$. Regularization adds a penalty on the different parameters of the model to reduce the freedom of the model. We leverage an asymmetric transition matrix to factorize the user-item preference matrix and associate a regularization penalty so that the model does not overfit or underfit. Recall that $T_{kj} \neq T_{jk}$. Thus, the transition regularization must involve an asymmetric measure to capture the divergence of $I_k$ to $I_j$, and vice versa. We assume each item latent factor as a normalized probability distribution, i.e., $\Sigma_{jd} Y_{jd} = 1$ and $\Sigma_{kd} Y_{kd} = 1$ and consider Kullback-Leibler (KL) divergence for measuring the cost.

$$\mathcal{L}_\mathcal{T}(X, Y) = \beta \sum_{k,j} (T_{kj} \cdot D(Y_j \| Y_k)) = \beta \sum_{k,j} \left( T_{kj} \cdot \left( -\sum_{d=1}^{D} Y_{jd} \log \frac{Y_{kd}}{Y_{jd}} \right) \right) \quad (4)$$

Note that, the usage of KL-divergence is different from how it has been popularly used in non-negative matrix factorization literature [15, 16]. Existing work considers $D(R\|XY)$ while embodiments consider $D(Y_j\|Y_k)$ where $Y_k \in Y, Y_j \in Y$.

Consider L2-regularization for $\mathcal{L}(X, Y)$.

$$\mathcal{L}_\mathcal{R}(X, Y) = \alpha(\|X\|^2 + \|Y\|^2) \quad (5)$$

Therefore, the optimization problem can be formulated as:

Minimize $L(X,Y) = \mathcal{L}_\mathcal{E}(R, f(X,Y)) + \mathcal{L}_\mathcal{T}(X,Y) + \mathcal{L}_\mathcal{R}(X, Y)$ with respect to $X$ and $Y$ subject to the constraints $X, Y \geq 0$ Previous examples have been viewed in the context of using explicit user-item feedback. In other embodiments, the objective function can be readily extended to handle implicit feedback [12].

The derived loss function can be non-convex with respect to both X and Y. Thus, it is unrealistic to expect a methodology that can find the global optima. However, various techniques can be employed from numerical optimization to arrive at a local minima. To solve this non-convex optimization problem, Stochastic Gradient Descent (SGD) (also known as Sequential Gradient Descent) can be used since it has been shown to be a powerful technique in handling non-convexity [1]. In particular, a variant of the Distributed Stochastic Gradient Descent (DSGD) technique by Gemulla et al. can be considered [8]. The work emphasizes the practicality of computing quick-and-dirty SGD updates for speed-up. While a DSGD technique can work on blocks that have no data in common in order to support simultaneous updates, techniques of embodiments do not assume block independence. The increased number of epochs may lead to increased coverage of the individual updates that may however be missed due to randomized block selection. Thus, techniques of the various embodiments are independent of the data distribution and can offer faster convergence and better generalizability. The details are presented in Algorithm 1.

---

Algorithm 1 DSGD Variant for Non-Negative Matrix Factorization

Require: Transition Matrix T, Initialized factor matrices
$X_0, Y_0$ $X \leftarrow X_0, Y \leftarrow Y_0$
   while not converged do /* epoch */
      L ← list of (i, j) where $R_{ij}$ is known
      B ← block size
      $N_B$ ← L / B /* Number of sub-epochs */
      for s = 1, ... $N_B$ do /* sub-epoch */
         $L_B$ ← select B tuples from L randomly
         for b = 1, ... size($L_B$) do in parallel
            (p, q) ← $L_B^b$
            $grad_x, grad_y$ ← compute_gradient($X_p, Y_q, T_q$)
            $X_p^t$ ← update($X_p^t, grad_x$)
            $Y_q^t$ ← update($Y_q^t, grad_y$)

---

Gradient-based iterative update rules for estimating X and Y are:

$$X_i^{(t+1)} \leftarrow X_i^{(t)} - \eta \frac{\partial L}{\partial X_i^{(t)}} = X_i^{(t)} - \eta \left( \frac{\partial \mathcal{L}_\mathcal{E}}{\partial X_i^{(t)}} + \frac{\partial \mathcal{L}_\mathcal{R}}{\partial X_i^{(t)}} \right) \quad (6)$$

$$Y_j^{(t+1)} \leftarrow Y_j^{(t)} - \eta \frac{\partial L}{\partial Y_j^{(t)}} = Y_j^{(t)} - \eta \left( \frac{\partial \mathcal{L}_\mathcal{E}}{\partial Y_j^{(t)}} + \frac{\partial \mathcal{L}_\mathcal{R}}{\partial Y_j^{(t)}} + \frac{\partial \mathcal{L}_\mathcal{T}}{\partial Y_j^{(t)}} \right) \quad (7)$$

where $\eta$ is the learning rate. For our objective function, the gradients are computed as:

$$\frac{\partial L}{\partial X_i} = 2 \left( \sum_j (X_i Y_j^T - R_{ij}) Y_j + \alpha X_i \right) \quad (8)$$

$$\frac{\partial \mathcal{L}_\mathcal{E}}{\partial Y_j} = 2 \left( \sum_i (Y_j X_i^T - R_{ij}) X_i \right), \quad \frac{\partial \mathcal{L}_\mathcal{R}}{\partial Y_j} = 2\alpha Y_j \quad (9)$$

$$\frac{\partial \mathcal{L}_\mathcal{T}}{\partial Y_j} = \beta \left[ (\log Y_j + I_{1 \times D}) \sum_{k=1}^N T_{kj} - \sum_{k=1}^N T_{kj} \log Y_k \right] \quad (10)$$

where $I_{1 \times D}$ represents an identity matrix of dimension 1×D and log represents element-wise natural logarithm.

Due to the non-negativity constraint in the optimization goal, Projected SGD can be performed [19] for updates, resulting in the following update rules:

$$X_i^{(t+1)} \leftarrow \max \left( \varepsilon, X_i^{(t)} - \eta \frac{\partial L}{\partial X_i^{(t)}} \right) \quad (11)$$

$$Y_j^{(t+1)} \leftarrow \max \left( \varepsilon, Y_j^{(t)} - \eta \frac{\partial L}{\partial Y_j^{(t)}} \right) \quad (12)$$

where $\varepsilon$ is a very small positive value close to zero. The zero value itself is avoided since a log value of −inf is undesirable in our application.

Still in reference to FIG. 8, at block 810, an estimated user-item preference matrix is determined based on the non-negative user factor submatrix and the non-negative item factor submatrix derived from the TRNMF at block 808. Once the low-rank matrices X and Y are determined, the estimated user-item preference matrix can be determined, since $\hat{R}=f(X,Y)$. The estimated user-item preference matrix can be continuously updated via additional input of user preference values and historic user ratings followed by TRNMF, which can allow the estimated user-item preference matrix to be further refined. The values of the estimated user-item preference matrix can include estimated user preference values corresponding to the missing user preference values in the user-item preference matrix. For example, the estimated user-item preference matrix can fill in the data gaps where the user-item preference data lacks user preference data. By filling in the missing preference data for various users, the estimated user-item preference matrix can be used to provide a more appropriate and desirable recommended item to a user device after receiving a request from the user device.

At block 812, a request message requesting a recommended item from a set of related items is received over a network from a user device of a user of a group of users. The request message can include a set identifier that can be used to identify the appropriate matrices corresponding to a specific set of items which are of the same item type. A request can be received from a user device requesting a recommended item, the recommended item being from a set of related items. Multiple requests can be received from one or more user devices can request a variety of recommended items for various item types (e.g., movies, travel, products). Multiple consecutive requests received by a user can be sequential requests for recommended items within the same set of related items (e.g., which three museums are the next best locations to visit) or can be separate requests for recommended items from different sets of related items (e.g., request a recommendation for a movie, then request a recommendation for a movie theater to visit).

At block 814, the estimated user-item preference matrix is accessed in response to receiving the request message at block 812 using the set identifier. The set identifier can be used to identify the estimated user-item preference matrix corresponding to the type of item the user device requested a recommendation for. For example, a request for a next national park to visit can be received, and there are several estimated user-item preference matrices that have been generated: an estimated user-item preference matrix for movies, estimated user-item preference matrix for art galleries, and estimated user-item preference matrix for national parks. The set identifier can correspond to the estimated user-item preference matrix for national parks such that the estimated user-item preference matrix for national parks can be accessed. The other two not relevant to the request received can be ignored, since those matrices each correspond to different set identifiers from the set identifier received with the request message.

At block 816, the recommended item is provided to the user device based on at least one of the estimated user preference values corresponding to the missing user preference values in the user-item preference matrix. Using at least one estimated value from the estimated user-item preference matrix, which can correspond to missing data of the user-item preference matrix, the user device can be provided with an appropriate recommendation. The estimated user preference values can provide for more data points upon which to make a recommendation, and more user preference data points can allow for more accurate recommendations. Thus, using at least one estimated user preference value from the estimated user-item preference matrix can provide for improved recommendations.

V. SEQUENTIAL RECOMMENDATION

This section describes the process in which a user requests a sequential recommendation or series of recommendations. Embodiments can analyze a most recent user-interacted item from a series of user-interacted items to determine a divergence from possible recommendations. The divergence determination can allow embodiments to further recommend more accurate and precise recommendations by filtering possible recommendation choices based on the divergence from the most recent item: items with a smaller divergence are recommended over items with a larger divergence from the most recent user-interacted item.

Figure 9:
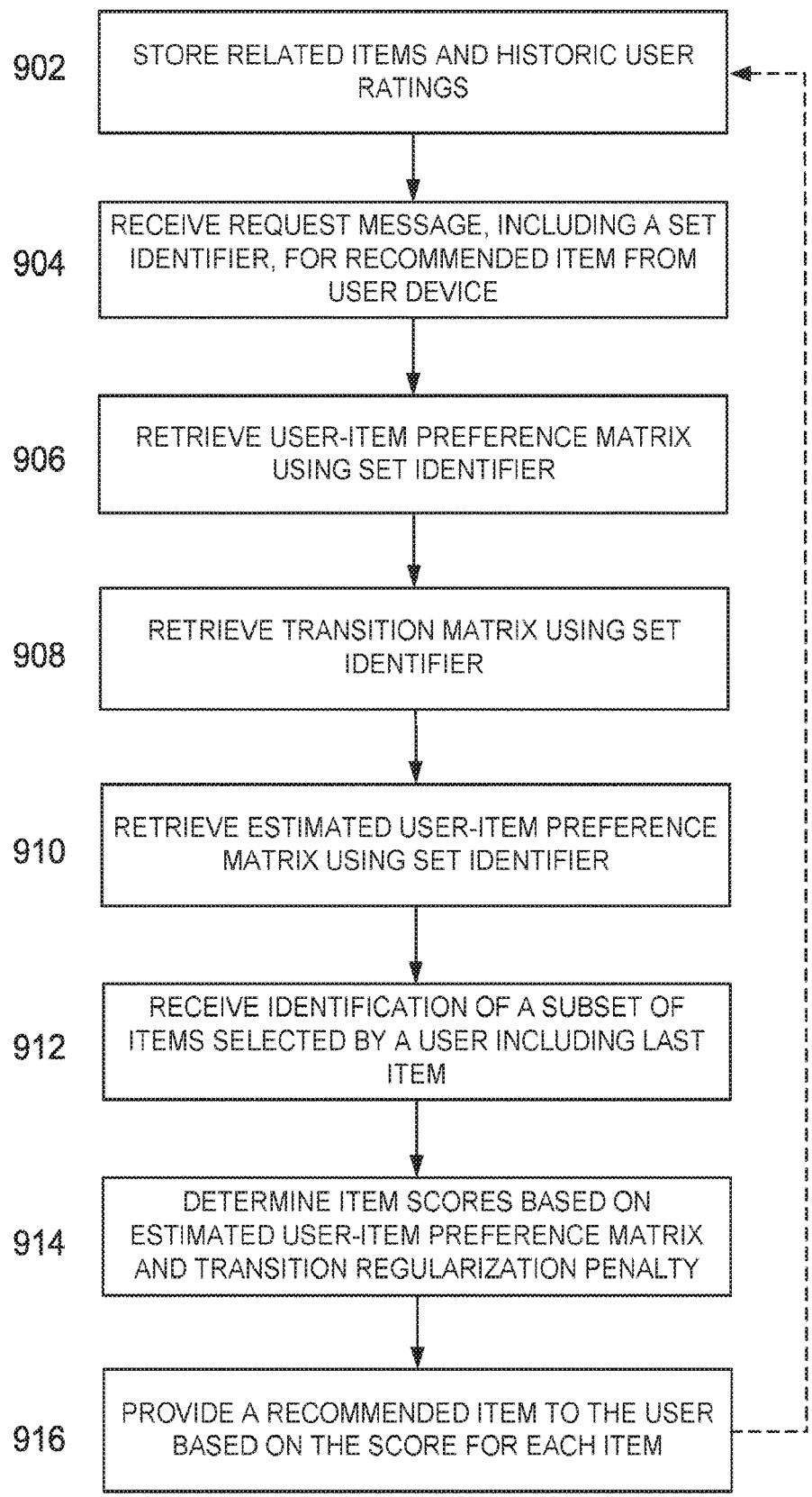
FIG. 9 is a flowchart for making sequential recommendations to a user based on a most recent user-interacted item according to embodiments of the present invention.

FIG. 9 depicts a flowchart for making sequential recommendations to a user based on a most recent user-interacted item according to some examples.

At block 902, a set of related items as well as a set of historic user ratings is stored in a database of a computer system in preparation for making sequential recommendations. The set of historic user ratings can correspond to the set of related items. The set of related items can be any number of logically related items. The set of related items with corresponding historic user ratings can be for a group of users. The historic user ratings can include item ratings for multiple users aggregated as a single rating per item, and separately include item ratings for a single user for any item from the set of related items. The set of related items can be stored in association with a set identifier for use in identifying a message from a user as corresponding to the set of related items. The database in which the set of related items and historic users ratings are stored can be missing historic user ratings for at least some of the group of users for at least some of the set of related items. For example, one or more items from each of one or more sets of related items can be stored in the database without having any user ratings or preference data.

At block 904, a request for a recommended item is received from a user device of a user of a group of users. The request may be received over a network. The request message can request a first recommended item from a set of related items. In some examples, a second request or one or more subsequent requests for a recommended item may be received from the user device. In some examples a second or subsequent request can be received before a user interacts with the first recommended item. The request message can include a set identifier for use in identifying the request message from a user as corresponding to the set of related items.

In some examples, a recommendation may be automatically requested by a user or user device and subsequently automatically provided to the requesting user, such that the user does not need to make a manual request for a recommendation. For example, a user may visit a website that recommends products to the user, based on the user's metadata, without the user asking for products in which they may be interested in. In the example shown in FIG. 1, a user's device may have a trip planning application implementing a recommender system that can acknowledge when the user arrives at a certain location, such as visited location 108, Arches National Park. The application may then, without prompting the user, determine the next logical location to visit, and automatically map or update the user's trip itinerary to the next visited item (e.g., visited location 110, Canyonlands National Park).

In some examples, a user can request multiple sequential recommendations in a row (i.e. the user can request a first recommended item, a second item based in part on the first item, a third item based in part on the first and second items, etc.). This methodology can allow a user to plot a series of related item to interact with. For example, with respect to FIG. 1, a user who has last visited location 108 can manually request a number of sequential recommendations for places to visit after visited location 108. The first request for recommendation may provide the user with visited location 110, since it is the closest national park to visited location 108. Prior to continuing the journey to visited location 110, the user may request a second recommendation. A second request for recommendation may instruct the user to visit visited location 112 after visited location 110, since it is the next closest park to visited location 110 by roadway and the direction of the road-trip as plotted by the first recommendation is southbound. Similarly, a third request for recommendation prior to leaving visited location 108 may result in a next waypoint of location 114 after visited location 112. The user can make as many requests for recommendations as there are items within a series of related items.

Considering the example illustrated in FIG. 1, a traveler at Yellowstone National Park will be recommended to travel to Arches National Park next. If a traveler wants to inspect the entire road-trip itinerary, the traveler can request a recommendation several times to retrieve the next best stop at each instance (given her most recent visit), thus receiving the recommendations {Arches National Park→Canyonlands National Park→Zion National Park→ . . . } in a sequence.

At block 906, a user-item preference matrix is received, where the user-item preference matrix includes user preference values for items of the set of related items based on the historic user ratings. The user-item preference matrix can be retrieved from the database using the set identifier. The set identifier can identify, out of one or more user-item preference matrices corresponding to different item types, the user-item preference matrix corresponding to the requested recommended item In some examples, retrieving the user-item preference matrix can allow the user-item preference matrix to be updated with any new preference data from the requesting user or other users. In some examples, the user-item preference matrix does not need to be retrieved from the database (e.g., the estimated user-item preference matrix has already been generated and no new user preference data corresponding to the requested item recommendation exists, and therefore the current user-item preference matrix used to generate the latest estimated user-item preference matrix is up to date).

At block 908, a transition matrix is received, where the transition matrix includes a total number of users transitioning between paired combinations of the set of related items. The transition matrix can be retrieved from the database using the set identifier. The set identifier can identify, out of one or more transition matrices corresponding to different item types, the transition matrix corresponding to the requested recommended item In some examples, retrieving the transition matrix can allow the transition matrix to be updated with any new item-item transition data from the requesting user or other users. In some examples, the transition matrix does not need to be retrieved from the database (e.g., the estimated user-item preference matrix has already been generated and no new user transition data corresponding to the requested item recommendation exists, and therefore the current transition matrix used to generate the latest estimated user-item preference matrix is up to date).

At block 910, an estimated user-item preference matrix is retrieved from the database using the set identifier. The retrieved estimated user-item preference matrix can be generated based on the user-item preference matrix and the transition matrix (i.e., TRNMF of the user-item preference matrix using the transition matrix).

At block 912, an identification of a recent subset of items selected by a user from a set of related items is received. The subset of items can be a sequence of items within a larger group of related items, all of which may be available as possible recommendation choices. The subset of items can be a group of items that a user has interacted with for purposes of determining a next logical recommendation based on the subset of items. The identification of the subset of items selected by a user can be items the user has manually selected or has interacted with (e.g., bought, visited, rated, etc.). The subset of items can include the sequence of user-interacted items including the most recent item (e.g., last item) that the user interacted with.

In examples where the user has not interacted with any items in a subset of items, the user may select an item or a subset of items to execute one or more sequential recommendations. This functionality can be useful for trip planning or planning to purchase a set of related items without having to embark on a journey or finalize any purchases. For example, a user may be planning to see a series of superhero movies, but doesn't know the order in which they were released, doesn't want to spend time watching one or two to later discover they were watched out of order, and doesn't want to watch the unpopular subsidiary movies. In this scenario, the user can select a movie to be the very first released, and can then iteratively request sequential recommendations to create an ordered list of movies that considers user preference ratings and item transitions (i.e. the movies with bad reviews that people tended to skip may not be recommended despite diverging from the release date order).

At block 914, a score for each item of the set of related items is determined. The scoring of each item is performed by using (i) an element of the estimated user-item preference matrix (as described in Section III) corresponding to a user and the item being scored, and (ii) a transition regularization penalty. The transition regularization penalty (as described in Section IV) can include a divergence value in the transition matrix between the recent subset of items identified in block 904, including the last item, and the item to be scored. The divergence value can be smaller for higher transition values, where higher transition values can result in a lower transition regularization penalty. The divergence value can be higher for smaller transition values, where smaller transition values can result in a higher transition regularization penalty. In some examples, a lower transition regularization penalty can correspond to a higher score and a higher transition regularization penalty can correspond to a lower score. The score can provide a probability of the item being selected after the user has interacted with the recent subset of items.

A score can be determined for each item after the low-rank matrices X and Y are determined: a ranking of unseen items in $\{I-I^i\}$ can be derived for user $U_i$ having current, i.e, most recent interaction with item $I_{j_i}^{\ i}$ at time $t_{t+1}^{\ i}$. The top-k items to be recommended to the user at e $t_t^{\ i}$ can be generated.

$$j_{l+1} = \underset{j \in I}{\mathrm{argmax}} S(X_i, Y_j, j_l) \qquad (13)$$

$$S(X_i, Y_j, j_l) = \gamma \sum_{d=1}^{D} X_{id} \cdot Y_{jd} - (1-\gamma) D(Y_{j_l} \| Y_j)$$

where $S(X_i, Y_j, j_l)$ is the scoring function to generate the ranking, $\gamma$ is a hyper-parameter controlling how extensively the current, i.e., most recent, user state information is to be incorporated into recommendation output. $\mathbb{I}$ is the set of indices from items in $\{I-I^i\}$, and $D(Y_{j_l} \| Y_j)$ is the KL-divergence from latent factor for $I_{j_l}$ to latent factors for items in unseen item set $\{I-I^i\}$. The item $I_{j_{l+1}}^{\ i}$ with the highest score is recommended to user $U_i$ at the next timestamp $t_{l+1}^{\ i}$. The top-n items to be recommended to user $U_i$ from the ranking can be generated.

At block 916, a recommended item can be provided to a user device over a network based on the score for each item. The item with the highest score can be determined at block 906, then be provided to the user for consumption. In some rare examples, two or more items from a set of related items may have equivalent or indistinguishable scores for purposes of recommending one best item to the user. In this example, a user may be provided with the series of equivalently scored items in a single instance. In other examples, the user may be provided with a series of similarly scored items in one request for recommendation even if those items are not equivalently scored, but instead fall within a range of most suitable scores.

When determining which items out of the set of related items are available choices to score, rank, then recommend, the recommender system may not include items that a user previously interacted with. For example, in FIG. 1, the visited locations 106, 108, 110, and 112 may not be available choices to recommend to the user since the user has already interacted with those items, and it may not be of interest to revisit a tourist location. In other examples, the recommender system may recommend items that the user has previously interacted with and would be useful or desirable for the user to interact with those items again. For example, a user may purchase an item and may be recommended to purchase a second related item. The user may interact with that item by adding it to a wish list or giving it a rating based on desirability without actually purchasing the second item. In this scenario, the recommender system would reassign a score to the second item based on the user-item interaction and subsequently recommend the second item again, perhaps over other similar items that were recommended alongside the second item when the user purchased the first item.

Recommendations may be provided when a user has no prior item interactions with a series of related items. The recommender system, based solely on the behavioral patterns of other users, can recommend an item to a new user that is typical of new users, despite the new user having no user-item interactions. For example, in FIG. 1, assuming a user has not visited any of the visited locations 106, 108, 110, 112, and it is typical based on multiple users' road-trips to start the journey at location 106, Yellowstone National Park, a recommendation can be given to a new user to begin the trip at visited location 106. However, a stronger and more logical recommendation can be given when a user does have a history of ratings or item interactions for a sequence of related items that the recommender system can learn from.

VI. EXPERIMENTAL RESULTS

We provide experimental results of various implementation for sequential recommendation using TRNMF. The data and techniques used to determine the experimental results are merely examples of various embodiments.

We use two publicly available datasets from two different domains, namely movies and travel, for our empirical study. Note that, our work focuses on explicit ratings (with timestamp) data which contains rich information about users' preferences for items as well as users' sequential activities. However, this limits the number of publicly available datasets that we can use in our experiments. Since we wanted to cover two different domains where sequential recommendation is meaningful, we consider the following: MovieLens and Foursquare.

The MovieLens 1M dataset, provided by GroupLens, consists of 1,000,209 ratings assigned to 3,900 movies by 6,040 users (grouplens.org/datasets/movielens/). The ratings are collected between April 2000 and February 2003 and are whole-star positive ratings on a 5-star scale. Each user has at least 20 ratings in the data. We follow the common practice from previous work [10] to remove movies with less than 20 ratings. The MovieLens dataset (like all other publicly available movie-rating datasets) has movie-rating sequence information, not movie-watching sequence information. Due to lack of a better alternative, this dataset has been popularly used in the literature for conducting experiments related to sequential recommendation. Also, the MovieLens dataset contains instances of several movies rated by the same user marked at the same timestamp. This is possibly because users cannot watch, but can rate, two movies at the same time. Previous work ignores this behavior in the MovieLens dataset and creates ordered sequences of item consumptions by users [5, 10]. In our data preparation, we consider a transition from one movie to another only if there is a change in the timestamps associated with them.

The Foursquare dataset, provided by Sarwat et al. [24] consists of 2,153,471 users, 1,143,092 venues, 1,021,970 check-ins, 27,098,490 social connections, and 2,809,581 ratings that users assign to venues (foursquare.com). We use the four month check-in history from May 2010 to August 2010. Location-based social network datasets usually do not have explicit rating information available for the check-in venues by the users. In other words, data that contains explicit venue ratings does not have check-in time information available, and vice versa. While this version of Foursquare data has some user-venue rating information available, they are not associated with the timestamp or check-in data. The literature assumes that a user's preferences are reflected by her frequency of check-in for locations [7] which eventually transform into the user-location check-in frequency matrix. This frequency data tends to have a big range compared to the explicit (e.g. 1-5 star) ratings. In addition, it is dramatically more sparse than user-item explicit rating matrix. As part of preprocessing, we follow the common practice from previous work [2] and require that every user should have checked-in at least 10 times and each location should be visited at least 10 times. Also, since a user may check-in multiple times at the same venue, each user-item pair has multiple timestamp information associated with it. We create an ordered sequences of user-venue check-ins based on the timestamp so that a user sequence may contain the same item, i.e., venue multiple times (unlike in MovieLens) and use the sequences to construct our venue-to-venue transition matrix.

The basic statistics are summarized in Table 2 below.

TABLE 2

| Data Statistics. | | | | | | |
|---|---|---|---|---|---|---|
| Dataset | #Users | #Items | #Ratings | Avg. #Actions per User | Avg. #Actions per Item | Data Sparsity in % |
| MovieLens | 6040 | 3043 | 989452 | 164.8 | 327.1 | 94.58 |
| Foursquare | 5589 | 8501 | 35389 | 7.3 | 4.8 | 99.91 |

A. Baselines

Since our model leverages both user-item preference information (i.e., user-item rating matrix) and user-item interaction sequence information (i.e., item-item transition matrix), we consider the best-of-both-worlds when selecting the baseline methods for evaluation purposes.

Matrix Factorization (MF): We compare our method to the most popular collaborative filtering method, Matrix Factorization [14], that decomposes the user-item rating matrix, and thus, is purely preference-based, meaning that the sequential information is lost in the process of factorization. In particular, we consider Non-Negative Matrix Factorization (NMF) [16] in our experiments. Note that our implementation of TRNMF can easily be reduced to NMF if the hyper-parameter $\beta$ is set to 0. We implement the MF method as well as retrieve results for $\beta=0$ in TRNMF. The better result among the two has been presented as the MF baseline in our quantitative experiments in Section VI.1.3.

Markov Chain (MC): We compare our method to recommendation based on a first-order Markov Chain [25], which is not personalized and relies only on the sequential relationships between items to make recommendations. In particular, given the user's current state, next stop is predicted using transition probabilities of a first order MC derived from user-item sequences [6].

B. Evaluation Set-Up and Metrics

1. Methodology

For each dataset, we partition the user-item interaction sequences into three parts:

the last interaction for test, i.e., $V_{j_{l+1}}^i$ at $t_{l+1}^i$ for $U_i$ where $I_{j_{l+1}}^i$ is the ground-truth item for the user the second last interaction for validation, i.e., $V_{j_l}^i$ all remaining interactions for training, i.e., $\{V_{j_1}^i, V_{j_1}^i \ldots V_{j_{l-1}}^i\}$ We tune hyper-parameters by grid search on the validation set and report the performance of the method(s) on the test set. The objective of our work is to recommend the next new promising item(s) to a user. The explicit feedback provided by users across all the training data is leveraged to estimate the ratings for the unseen items for each user. Thus, our recommended item is always a highly-rated item from the user's set of unseen items. This is as opposed to the previous work in the literature, which is not concerned about the actual quality of recommendation but the user-item interaction itself. In order to validate that our method recommends items to a user that she is expected to like, we remove those users from the test set whose ground-truth next item (i.e. the test item) has a relevance rating less than a threshold, say, 3.5 for MovieLens. This threshold value has been used before in the literature to distinguish a relevant item from irrelevant [11]. We conduct experiments with different relevance rating thresholds (on MovieLens dataset) and demonstrate how our method returns highly relevant items to a user for the next timestamp as opposed to just predicting the next item in the sequence. For Foursquare, we set the rating threshold to 1 since a user's visit (or, non-visit) to a venue at the next time-stamp is all that we have available as ground truth.

2. Measure

In order to compare our methodology with state-of-the-art baselines on the same framework, our evaluation metric is area under the curve (AUC):

$$AUC = \frac{1}{M} \sum_{U_i \in U} \left( \frac{1}{(I - I^i)}, \sum_{I_j \in (I-I^i)} 1(\text{Rank } (U_i, I_{gt}^i) < \text{Rank } (U_i, I_j^i)) \right)$$

where $(I-I^t)$ is the set of unseen items for user $U_i$, $\text{Rank}(U_i, I_j^i)$ is the rank of an item $I_1$ for user $U_i$, $I_{gt}^i$ represents the ground-truth item for user $U_i$, and 1(b) is the indicator function that returns 1 if the argument b is true and 0 otherwise.

3. Reproducibility

Hyper-parameter tuning was conducted through the validation procedure described in section 0.3.1. Based on the values derived from tuning, hyper-parameter $\alpha$ for L2 regularization is set to 0.1 (MovieLens) and 0.5 (Foursquare), the transition matrix regularization parameter $\beta$ is set to 0.1, the gradient descent learning parameter $\eta$ is set to 0.1, the recommendation phase current state controller parameter is set to 0.1, the number of epochs is set to 10, the latent factor dimension D is set to 20 (MovieLens) and 10 (Foursquare), the rating threshold for test set selection is set to 3.5, and the transition matrix window length is set to 10 for all experiments on all datasets, unless otherwise specified.

4. System Configuration

Our prototype model is implemented in Python 2.7. All experiments are conducted on a Linux machine with 2.60 GHz Intel processor, 48 CPU cores, and 800 GB RAM. The computational costs associated with training our models for the two datasets are manageable. MovieLens takes about 4 hours to train while Foursquare takes about 3 hours for the default parameter settings specified above.

Next, we present our quantitative experimental results as well as a qualitative case study demonstrating the effectiveness of our proposed solution.

C. Quantitative Results

We conduct a comprehensive set of experiments using both datasets to evaluate the effectiveness of our proposed methodology. First, we compare the AUC score for all three methods on both datasets. The results are presented in Table 3. For TRNMF, we consider the default parameter values specified in Section 0.3.3 and increase the number of epochs to 20 for MovieLens only. Due to sparsity of both the datasets, no methodology observed significant performance improvement when latent factor dimension D is increased beyond 10. We see that TRNMF achieves considerably better results than both MF and MC, thereby validating the superiority of the proposed methodology. The improvement is about 4% over the strongest baseline for MovieLens dataset and about 4.5% over the strongest baseline for Foursquare dataset. Note that the AUC score for the second best baseline for Foursquare dataset, i.e., MF is much lower than the AUC Score for MC and TRNMF. This is because Foursquare is an extremely sparse data (see Table 2). In fact, we column-normalize the user-check-in frequency matrix from Foursquare data for MF in order to nullify the effects of skew in popularity of venues and user activities [Anastasios Noulas, Salvatore Scellato, Neal Lathia, and Cecilia Mascolo. 2012. A Random Walk around the City: New Venue Recommendation in Location-Based Social Networks. In 2012 *International Conference on Privacy, Security, Risk and Trust, PASSAT* 2012, and 2012 *International Confernece on Social Computing, SocialCom* 2012, Amsterdam, Netherlands, Sep. 3-5, 2012. 144-153].

Figure 10:
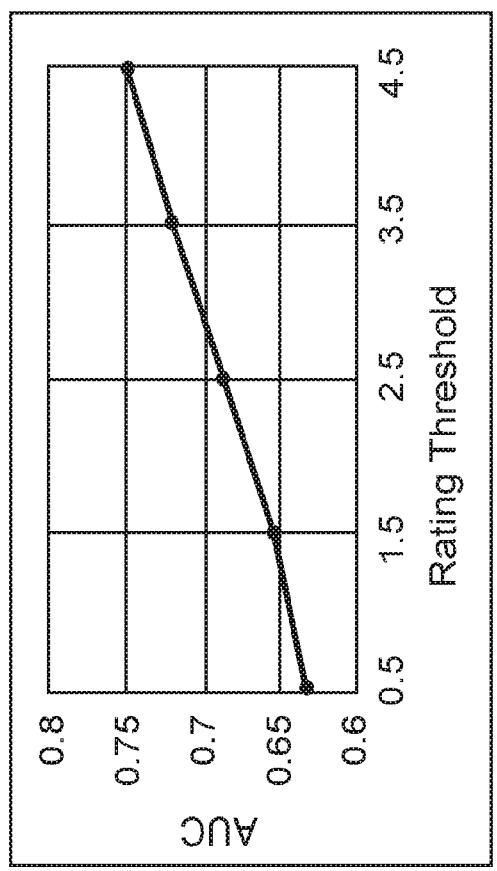
FIG. 10 is diagram depicting AUC variation with increasing rating threshold for test set selection according to embodiments of the present invention.

Second, we demonstrate that TRNMF is more concerned about recommending relevant items to a user for the next timestamp, than just predicting the next item the user is likely to consume in the next timestamp. For this, we conduct a parameter sensitivity analysis experiment where we study the behavior of the AUC score as the item relevance threshold changes. We conduct this experiment for MovieLens dataset since the actual rating value for the venue a user would visit next, i.e., ground truth rating information for test users, is not available in the Foursquare dataset. As expected, for our method, the AUC score increases as the threshold increases, thereby demonstrating the effectiveness or TRNMF in guaranteeing recommendation of relevant items to users. The results are depicted by the AUC-Rating Threshold graph of FIG. 10.

TABLE 3

| AUC score (the higher, the better). | | | |
| --- | --- | --- | --- |
| Dataset | MF | MC | TRNMF |
| MovieLens | 0.6887 | 0.6918 | 0.7193 |
| Foursquare | 0.6218 | 0.6776 | 0.7078 |

D. Qualitative Results

We now evaluate the effectiveness of our methodology in making personalized sequential recommendations via a case study on the MovieLens dataset. We choose MovieLens (and not Foursquare) since MovieLens has movie titles associated with the item ID-s and has explicit user rating associated with the items participating in the test set. In order to prepare the case study, we leave out the last 10 items in each user-item interaction sequence for test, and train on the rest. Our TRNMF returns the top-5 items to a user, given the user's most recent known item consumption. As part of the case study, we assess the quality of the results returned by our methodology. In particular, we analyze the relationship between the movies recommended to a user in a sequence and her historical movie-rating sequence as well as the movie last rated by her. Table 4 demonstrates our sequential recommendations for a number of users in the MovieLens dataset.

User $U_1$: This user has watched the fourth movie in the Star Wars sequel, Star Wars: Episode IV—A New Hope (1977) most recently and rated it high. Users across the MovieLens dataset watch the fifth movie in the Star Wars series after the fourth more often (see table 6). TRNMF captures this pattern in transition by recommending the user to watch the next Star Wars movie in the series, i.e. Star Wars: Episode V—The Empire Strikes Back (1980) right after Star Wars: Episode IV. Not only does TRNMF successfully transfer the user's history to the recommendation result, it also lives up to her expectations by including two of her four most liked movies (according to ground truth) in the recommended sequence.

User $U_2$: This user seems to like fantasy-thriller alien movies since she has rated both the movies Alien (1979) and Aliens (1986) high. TRNMF captures this user taste and recommends another fantasy-thriller alien movie Close Encounters of the Third Kind (1977) to the user. TRNMF recommends the user $U_2$ to watch the Matrix (1999) next, which a lot of users tend to watch after the user's most recent movie, Star Wars: Ep. IV~A New Hope (1977) (see table 5). The movie sequence recommended by TRNMF also preserves the order of the Terminator movie series by placing the first movie in the sequel, i.e. Terminator (1984) ahead of Terminator 2: Judgment Day (1991). Since we focus on a length-5 sequence for each user in the study, we do not see Terminator 2: Judgment Day (1991) in the sequence in Table 4. Thus our methodology conserves the asymmetric nature of transition in sequential recommendation.

User $U_3$: This user seems to like Marlon Brando movies and mob-gangster movies since she rated both Apocalypse Now (1979) and Goodfellas (1990) high. She did not like Toy Story (1995). Hence, TRNMF recommends Godfather movies to the user in the correct sequence and does not recommend Toy Story 2 (1999). Note that, the ground truth includes Toy Story 2 (1999) and the user rated it very low. Thus, our methodology leverages the user's sequential activity pattern as well as preference in order to recommend a meaningful sequence of items relevant to her.

TABLE 4

Sequential Recommendation results on the MovieLens dataset where $SEQ_i^{TRNMF}$: sequence recommended to user $U_i$ by TRNMF, $SEQ_i^{GT}$: true movie-rating sequence of user $U_i$, i.e., ground truth according to the data, and $SEQ_i^{HIST}$: user's most recent movie-rating history.

| | | |
|---|---|---|
| *$U_1$ | $SEQ_1^{TRNMF}$ | The Usual Suspects → Star Wars: Ep. V - The Empire Strikes Back → Blade Runner → Saving Private Ryan → Fargo |
| | $SEQ_1^{GT}$ | Saving Private Ryan (5) → GoodFellas (5) → Psycho (4) → The Usual Suspects (5) → Breaking Away (5) |
| | $SEQ_1^{HIST}$ | . . . → Pulp Fiction (5) → Amadeus (5) → Raiders of the Lost Ark (4) → Hoop Dreams (3) → Star Wars: Ep. IV - A New Hope (5) |
| *$U_2$ | $SEQ_2^{TRNMF}$ | The Matrix → Terminator → Star Wars: Ep. VI - Return of the Jedi → Close Encounters of the Third Kind → E.T. the Extra-Terrestrial |
| | $SEQ_2^{GT}$ | Back to the Future (4) → The Matrix (5) → Close Encounters of the Third Kind (4) → Twelve Monkeys (3) → Terminator 2: Judgment Day (4) |
| | $SEQ_2^{HIST}$ | . . . → Young Frankenstein (3) → Alien (4) → Blade Runner (5) → Aliens (5) → Star Wars: Ep. IV - A New Hope (5) |

TABLE 4-continued

Sequential Recommendation results on the MovieLens dataset where $SEQ_i^{TRNMF}$: sequence recommended to user $U_i$ by TRNMF, $SEQ_i^{GT}$: true movie-rating sequence of user $U_i$, i.e., ground truth according to the data, and $SEQ_i^{HIST}$: user's most recent movie-rating history.

| | | |
|---|---|---|
| *$U_3$ | $SEQ_3^{TRNMF}$ | One Flew Over the Cuckoo's Nest → The Godfather → Romance → The Godfather Part II → Psycho |
| | $SEQ_3^{GT}$ | Toy Story 2 (1) → The Godfather Part II (4) → The Godfather (5) → Limbo (3) → Romance (1) |
| | $SEQ_3^{HIST}$ | . . . → GoodFellas (5) → American Beauty (5) → Toy Story (2) → 'Everything You Always Wanted to Know About Sex (4) → Apocalypse Now (5) |

The star rating user $U_i$ has assigned to the corresponding movie is shown in parentheses to emphasize the importance of the item relevance in our method.

TABLE 5

10 Most Popular Transition Pairs on MovieLens 1M for Window Size 10. $T_{M_1 \to M_2}$ is the frequency of transition from movie $M_1$ to movie $M_2$ across all users.

| $M_1$ | $M_2$ | $T_{M_1 \to M_2}$ |
|---|---|---|
| American Beauty (1999) | Being John Malkovich (1999) | 623 |
| Star Wars: Ep. V - The Empire Strikes Back (1980) | Terminator, The (1984) | 576 |
| The Shawshank Redemption (1994) | The Silence of the Lambs (1991) | 547 |
| Star Wars: Ep. IV - A New Hope (1977) | The Terminator (1984) | 511 |
| Star Wars: Ep. IV - The Empire Strikes Back (1980) | Star Wars: Ep. VI - Return of the Jedi (1983) | 486 |
| Jurassic Park (1993) | Men in Black (1997) | 480 |
| The Matrix (1999) | Total Recall (1990) | 479 |
| Terminator 2: Judgment Day (1991) | Total Recall (1990) | 478 |
| Raiders of the Lost Ark (1981) | Indiana Jones and the Last Crusade (1989) | 477 |
| Star Wars: Ep. V - The Empire Strikes Back (1980) | Aliens (1986) | 466 |

TABLE 6

Movie Transition Pairs for Case Study Result interpretability.

| $M_1$ | $M_2$ | $T_{M_1 \to M_2}$ |
|---|---|---|
| The Godfather (1972) | The Godfather: Part II (1974) | 346 |
| Star Wars: Ep. IV - A New Hope (1977) | Star Wars: Ep. V - The Empire Strikes Back (1980) | 399 |
| Star Wars: Ep. V - The Empire Strikes Back (1980) | Star Wars: Ep. IV - A New Hope (1977) | 177 |
| Star Wars: Episode IV - A New Hope (1977) | The Matrix (1999) | 454 |
| The Usual Suspects (1995) | Fargo (1996) | 304 |
| The Matrix (1999) | Terminator (1984) | 218 |
| Terminator 2: Judgment Day (1991) | Aliens (1986) | 185 |
| Alien (1979) | The Terminator (1984)' | 446 |
| Terminator (1984) | Terminator 2: Judgment Day (1991) | 245 |
| Terminator 2: Judgment Day (1991) | Terminator (1984) | 228 |

VII. COMPUTER SYSTEM

Figure 11:
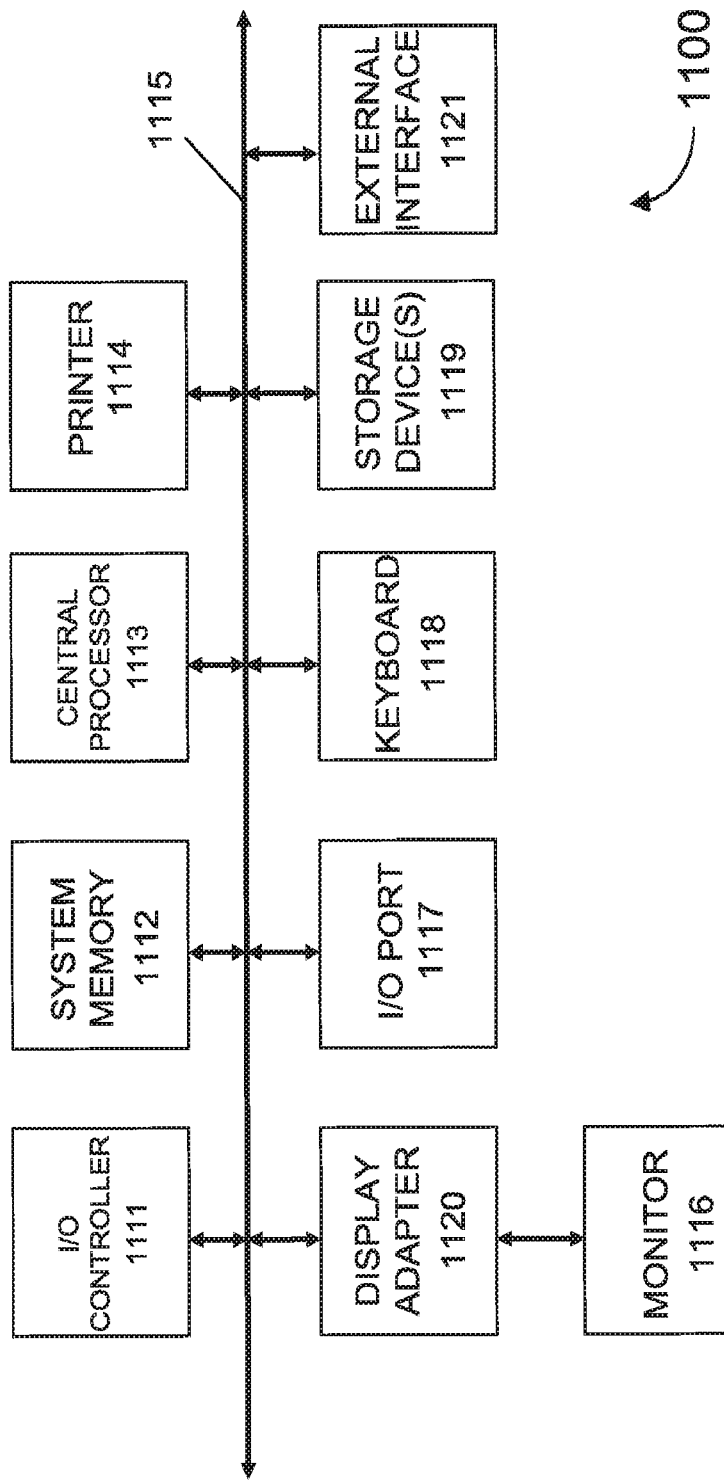
FIG. 11 shows a block diagram of an example computer system usable with system and methods according to embodiments of the present invention.

FIG. 11 shows a block diagram of an example computer system usable with system and methods according to one example.

Any of the computer systems mentioned herein may utilize any suitable number of subsystems. Examples of such subsystems are shown in FIG. 11 in computer apparatus 1100. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 11 are interconnected via a system bus 1115. Additional subsystems such as a printer 1114, keyboard 1118, storage device(s) 1119, monitor 1116, which is coupled to display adapter 1120, and others are shown. Peripherals and input/output (I/O) devices, which couple to I/O controller 1111, can be connected to the computer system by any number of means known in the art such as input/output (I/O) port 1117 (e.g., USB, FireWire®). For example, I/O port 1117 or external interface 1121 (e.g. Ethernet, Wi-Fi, etc.) can be used to connect computer apparatus 1100 to a wide area network such as the Internet, a mouse input device, or a scanner. The interconnection via system bus 1115 allows the central processor 1113 to communicate with each subsystem and to control the execution of instructions from system memory 1112 or the storage device(s) 1119 (e.g., a fixed disk, such as a hard drive or optical disk), as well as the exchange of information between subsystems. The system memory 1112 and/or the storage device(s) 1119 may embody a computer readable medium, which may be a non-transitory computer readable medium. Any of the data mentioned herein can be output from one component to another component and can be output to the user.

A computer system can include a set of the same components or subsystems, e.g., connected together by external interface 1121 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

VIII. REFERENCES

[1] Léon Bottou. 2010. Large-scale machine learning with stochastic gradient descent. In *Proceedings of Nineteenth International Conference on Computational Statistics*, COMPSTAT 2010, Aug. 22-27, 2010, Paris France. Springer, 177-186.

[2] Chen Cheng, Haiqin Yang, Michael R. Lyu, and Irwin King. 2013. Where You Like to Go Next: Successive Point-of-Interest Recommendation. In *IJCAI 2013, Proceedings of the 23rd International Joint Conference on Artificial Intelligence*, Beijing, China, Aug. 3-9, 2013. 2605-2611.

[3] Robin Devooght and Hugues Bersini. 2017. Long and Short-Term Recommendations with Recurrent Neural Networks. In *Proceedings of the 25th Conference on User Modeling, Adaptation and Personalization*, UMAP 2017, Bratislava, Slovakia, Jul. 9-12, 2017. 13-21.

[4] Yi Ding and Xue Li. 2005. Time weight collaborative filtering. In *Proceedings of the 2005 ACM CIKM International Conference on Information and Knowledge Management*, Bremen, Germany, Oct. 31-Nov. 5, 2005. 485-492.

[5] Tim Donkers, Benedikt Loepp, and Jurgen Ziegler. 2017. Sequential User-based Recurrent Neural Network Recommendations. In *Proceedings of the Eleventh ACM Conference on Recommender Systems, RecSys 2017*, Como, Italy, Aug. 27-31, 2017. 152-160.

[6] Shanshan Feng, Xutao Li, Yifeng Zeng, Gao Cong, Yeow Meng Chee, and Quan Yuan. 2015. Personalized Ranking Metric Embedding for Next New POI Recommendation. In *Proceedings of the Twenty-Fourth International Joint Conference on Artificial Intelligence, IJCAI 2015*, Buenos Aires, Argentina, Jul. 25-31, 2015. 2069-2075.

[7] Huiji Gao, Jiliang Tang, Xia Hu, and Huan Liu. 2013. Exploring temporal effects for location recommendation on location-based social networks. In *Seventh ACM Conference on Recommender Systems, RecSys '13*, Hong Kong, China, Oct. 12-16, 2013. 93-100.

[8] Rainer Gemulla, Erik Nijkamp, Peter J. Haas, and Yannis Sismanis. 2011. Largescale matrix factorization with distributed stochastic gradient descent. In *Proceedings of the 17th ACM SIGKDD International Conference on Knowledge Discovery and Data Mining*, San Diego, Calif., USA, Aug. 21-24, 2011. 69-77.

[9] Ruining He, Wang-Cheng Kang, and Julian McAuley. 2017. Translation-based Recommendation. In *Proceedings of the Eleventh ACM Conference on Recommender Systems, RecSys 2017*, Como, Italy, Aug. 27-31, 2017. 161-169.

[10] Ruining He and Julian McAuley. 2016. Fusing Similarity Models with Markov Chains for Sparse Sequential Recommendation. In *IEEE 16th International Conference on Data Mining, ICDM 2016*, Dec. 12-15, 2016, Barcelona, Spain. 191-200.

[11] Jonathan L. Herlocker, Joseph A. Konstan, Loren G. Terveen, and John Riedl. 2004. Evaluating collaborative filtering recommender systems. *ACM Trans. Inf. Syst.* 22, 1 (2004), 5-53.

[12] Yifan Hu, Yehuda Koren, and Chris Volinsky. 2008. Collaborative Filtering for Implicit Feedback Datasets. In *Proceedings of the 8th IEEE International Conference on Data Mining (ICDM 2008)*, Dec. 15-19, 2008, Pisa, Italy. 263-272.

[13] Yehuda Koren. 2009. Collaborative filtering with temporal dynamics. In *Proceedings of the 15th ACM SIGKDD International Conference on Knowledge Discovery and Data Mining*, Paris, France, Jun. 28-Jul. 1, 2009. 447-456.

[14] Yehuda Koren, Robert M. Bell, and Chris Volinsky. 2009. Matrix Factorization Techniques for Recommender Systems. *IEEE Computer* 42, 8 (2009), 30-37.

[15] Daniel D. Lee and H. Sebastian Seung. 1999. Learning the parts of objects by non-negative matrix factorization. *Nature* 401,6755 (1999), 788-791.

[16] Daniel D. Lee and H. Sebastian Seung. 2000. Algorithms for Non-negative Matrix Factorization. In *Advances in Neural Information Processing Systems 13, Papers from Neural Information Processing Systems (NIPS) 2000*, Denver, Colo., USA. 556-562.

[17] Omer Levy and Yoav Goldberg. 2014. NeuralWord Embedding as Implicit Matrix Factorization. In *Advances in Neural Information Processing Systems 27: Annual Conference on Neural Information Processing Systems 2014*, Dec. 8-13, 2014, Montreal, Quebec, Canada. 2177-2185.

[18] Dawen Liang, Jaan Altosaar, Laurent Charlin, and David M. Blei. 2016. Factorization Meets the Item Embedding: Regularizing Matrix Factorization with Item Co-occurrence. In *Proceedings of the 10th ACM Conference on Recommender Systems*, Boston, Mass., USA, Sep. 15-19, 2016. 59-66.

[19] Chih-Jen Lin. 2007. Projected Gradient Methods for Nonnegative Matrix Factorization. *Neural Computation* 19, 10 (2007), 2756-2779.

[20] Qiang Liu, Shu Wu, Diyi Wang, Zhaokang Li, and Liang Wang. 2016. Context-Aware Sequential Recommendation. In *IEEE 16th International Conference on Data Mining, ICDM 2016*, Dec. 12-15, 2016, Barcelona, Spain. 1053-1058.

[21] Anastasios Noulas, Salvatore Scellato, Neal Lathia, and Cecilia Mascolo. 2012. A Random Walk around the City: New Venue Recommendation in Location-Based Social Networks. In *2012 International Conference on Privacy, Security, Risk and Trust, PASSAT 2012, and 2012 International Conference on Social Computing, SocialCom 2012*, Amsterdam, Netherlands, Sep. 3-5, 2012. 144-153.

[22] Zachary A. Pardos, Steven Tang, Daniel Davis, and Christopher Vu Le. 2017. Enabling Real-Time Adaptivity in MOOCs with a Personalized Next-Step Recommendation Framework. In *Proceedings of the Fourth ACM Conference on Learning @ Scale, L@S 2017*, Cambridge, Mass., USA, Apr. 20-21, 2017. 23-32.

[23] Steffen Rendle, Christoph Freudenthaler, and Lars Schmidt-Thieme. 2010. Factorizing personalized Markov chains for next-basket recommendation. In *Proceedings of the 19th International Conference on World Wide Web, W W W 2010*, Raleigh, N.C., USA, Apr. 26-30, 2010. 811-820.

[24] Mohamed Sarwat, Justin J. Levandoski, Ahmed Eldawy, and Mohamed F. Mokbel. 2014. LARS*: An Efficient and Scalable Location-Aware Recommender System. *IEEE Trans. Knowl. Data Eng.* 26, 6 (2014), 1384-1399.

[25] Guy Shani, David Heckerman, and Ronen I. Brafman. 2005. An MDP-Based Recommender System. *Journal of Machine Learning Research* 6 (2005), 1265-1295.

[26] Xiang Wu, Qi Liu, Enhong Chen, Liang He, Jingsong Lv, Can Cao, and Guoping Hu. 2013. Personalized next-song recommendation in online karaokes. In *Seventh ACM Conference on Recommender Systems, RecSys '13*, Hong Kong, China, Oct. 12-16, 2013. 137-140.

[27] Liang Xiong, Xi Chen, Tzu-Kuo Huang, Jeff G. Schneider, and Jaime G. Carbonell. 2010. Temporal Collaborative Filtering with Bayesian Probabilistic Tensor Factorization. In *Proceedings of the SIAM International Conference on Data Mining, SDM* 2010, Apr. 29-May 1, 2010, Columbus, Ohio, USA. 211-222.

[28] Sheng Zhang, Weihong Wang, James Ford, and Fillia Makedon. 2006. Learning from Incomplete Ratings Using Non-negative Matrix Factorization. In *Proceedings of the Sixth SIAM International Conference on Data Mining*, Apr. 20-22, 2006, Bethesda, Md., USA. 549-553.

What is claimed is:

1. A method comprising performing by a computer system:
    storing, in a database of the computer system, a set of related items with corresponding historic user ratings for a group of users, the set of related items stored in association with a set identifier for use in identifying a message from a user as corresponding to the set of related items, wherein the database is missing the historic user ratings for at least some of the group of users for at least some of the set of related items, and wherein the historic user ratings include non-binary numbers;
    generating a user-item preference matrix including user preference values for items of the set of related items based on the historic user ratings, the user-item preference matrix missing user preference values corresponding to the missing historic user ratings;
    generating a transition matrix by aggregating a total number of users transitioning between paired combinations of the set of related items;
    factorizing, using the transition matrix, the user-item preference matrix to obtain:
        (a) a non-negative user factor submatrix representing latent user factors, the latent user factors corresponding to missing historic user ratings in the database; and
        (b) a non-negative item factor submatrix representing latent item factors, wherein a higher transition value between a paired combination enforces latent item factors to be closer in value than latent item factors corresponding to a lower transition value between the paired combination;
        wherein the factorizing includes an optimization of a cost function that includes a transition regularization penalty including a divergence value for distances between paired combinations in the transition matrix;
    determining an estimated user-item preference matrix based on the non-negative user factor submatrix and the non-negative item factor submatrix, the estimated user-item preference matrix including first estimated user preference values corresponding to the missing user preference values in the user-item preference matrix;
    receiving, over a network from a user device of a user of the group of users, a request message requesting a recommended item from the set of related items, the request message including the set identifier;
    accessing, using the set identifier, the estimated user-item preference matrix in response to receiving the request message; and
    providing, over the network, the recommended item to the user device based on at least one of the first estimated user preference values corresponding to the missing user preference values in the user-item preference matrix.

2. The method of claim 1, wherein higher latent item factors between paired combinations correspond to an increased probability that a user will transition from a first item of a paired combination of items to a second item of the paired combination of items, and wherein lower latent item factors between paired combinations correspond to a decreased probability that a user will transition from the first item of the paired combination of items to the second item of the paired combination of items as compared to paired combinations having higher latent item factors.

3. The method of claim 1, wherein the historic user ratings includes user ratings for a single user and user ratings for the group of users, and wherein the user ratings for a single user are distinguishable from the user ratings for the group of users.

4. The method of claim 1, wherein the transition regularization penalty is an asymmetric transition regularization penalty, and wherein the transition matrix is an asymmetric transition matrix.

5. The method of claim 1, wherein the higher transition value corresponds to a higher number of users transitioning between paired combinations of items in the transition matrix, and wherein a lower transition value corresponds to a lower number of users transitioning between paired combination of items in the transition matrix.

6. The method of claim 1, wherein the optimization of the cost function includes minimizing (i) loss between the user-item preference matrix and the estimated user-item preference matrix, (ii) the transition regularization penalty, and (iii) a regularization penalty to avoid overfitting.

7. A method comprising performing by a computer system:
    storing, in a database of the computer system, a set of related items with corresponding historic user ratings for a group of users, the set of related items stored in association with a set identifier;
    receiving, over a network from a user device of a user of a group of users, a request message requesting a first recommended item from a set of related items, the request message including the set identifier for use in identifying the request message from a user as corresponding to the set of related items;
    retrieving, from the database using the set identifier, a user-item preference matrix including user preference values for items of the set of related items based on the historic user ratings;
    retrieving, from the database using the set identifier, a transition matrix including a total number of users transitioning between paired combinations of the set of related items;
    retrieving, from the database using the set identifier, an estimated user-item preference matrix, the estimated user-item preference matrix being generated based on the user-item preference matrix and the transition matrix;
    receiving, from the user device of the user, an identification of a recent subset of the set of related items, wherein the recent subset includes items from the set of related items that the user has interacted with, wherein the recent subset includes a last item corresponding to a most recent item in the recent subset that the user has interacted with;

determining a score for each item of the set of related items using:
  (a) an element of an estimated user-item preference matrix corresponding to the user and the item to be scored; and
  (b) a transition regularization penalty including a divergence value in the transition matrix between the last item and the item to be scored, wherein the divergence value is smaller for higher transition values, the higher transition values resulting in a lower transition regularization penalty, and wherein the divergence value is higher for smaller transition values, the smaller transition values resulting in a higher transition regularization penalty;
  wherein a lower transition regularization penalty corresponds to a higher score and a higher transition regularization penalty corresponds to a lower score; and
providing, over the network to the user device, the first recommended item based on the score for each item.

8. The method of claim 7, further comprising:
providing, over the network to the user device, a second recommended item based on the score for each item, wherein the second recommended item includes the first recommended item in the recent subset, wherein the first recommended item is used as the last item.

9. The method of claim 8, wherein a second request for the second recommended item from the user device is received over the network before the user interacts with the first recommended item.

10. The method of claim 7, wherein the estimated user-item preference matrix is a result of factorizing the user-item preference matrix using the transition matrix.

11. The method of claim 7, wherein the score provides a probability of the item to be scored being selected after the recent subset.

12. The method of claim 7, wherein providing the first recommended item based on the score for each item further includes determining the item of the set of related items with a highest score.

13. A system comprising:
a processing device,
a communications port, and
a non-transitory computer-readable medium comprising instructions that are executable by the processing device to:
  store, in a database, a set of related items with corresponding historic user ratings for a group of users, the set of related items stored in association with a set identifier for use in identifying a message from a user as corresponding to the set of related items, wherein the database is missing the historic user ratings for at least some of the group of users for at least some of the set of related items, and wherein the historic user ratings include non-binary numbers;
  generate a user-item preference matrix including user preference values for items of the set of related items based on the historic user ratings, the user-item preference matrix missing user preference values corresponding to the missing historic user ratings;
  generate a transition matrix by aggregating a total number of users transitioning between paired combinations of the set of related items;
  factorize, using the transition matrix, the user-item preference matrix to obtain:
    (a) a non-negative user factor submatrix representing latent user factors, the latent user factors corresponding to missing historic user ratings in the database; and
    (b) a non-negative item factor submatrix representing latent item factors, wherein a higher transition value between a paired combination enforces latent item factors to be closer in value than latent item factors corresponding to a lower transition value between the paired combination;
    wherein factorizing includes an optimization of a cost function that includes a transition regularization penalty including a divergence value for distances between paired combinations in the transition matrix;
  determine an estimated user-item preference matrix based on the non-negative user factor submatrix and the non-negative item factor submatrix, the estimated user-item preference matrix including first estimated user preference values corresponding to the missing user preference values in the user-item preference matrix;
  receive, by the communications port from a user device of a user of the group of users, a request message requesting a first recommended item from the set of related items, the request message including the set identifier;
  receive, by the communications port from the user device of the user, an identification of a recent subset of the set of related items, wherein the recent subset includes items from the set of related items that the user has interacted with, wherein the recent subset includes a last item corresponding to a most recent item in the recent subset that the user has interacted with;
  determine a score for each item of the set of related items using:
    (a) an element of an estimated user-item preference matrix corresponding to the user and the item to be scored; and
    (b) a transition regularization penalty including a divergence value in the transition matrix between the last item and the item to be scored, wherein the divergence value is smaller for higher transition values, the higher transition values resulting in a lower transition regularization penalty, and wherein the divergence value is higher for smaller transition values, the smaller transition values resulting in a higher transition regularization penalty;
    wherein a lower transition regularization penalty corresponds to a higher score and a higher transition regularization penalty corresponds to a lower score; and
  provide, by the communications port to the user device, the first recommended item based on the score for each item and at least one of the first estimated user preference values corresponding to the missing user preference values in the user-item preference matrix.

14. The system of claim 13, wherein the historic user ratings includes user ratings for a single user and user ratings for a plurality of users, and wherein the user ratings for a single user are distinguishable from the user ratings for a plurality of users.

15. The system of claim 13, wherein higher latent item factors between paired combinations correspond to an increased probability that a user will transition from a first item of a paired combination of items to a second item of the paired combination of items, and wherein lower latent item factors between paired combinations correspond to a decreased probability that a user will transition from the first item of the paired combination of items to the second item of the paired combination of items as compared to paired combinations having higher latent item factors.

16. The system of claim 13, wherein the optimization of the cost function includes minimizing (i) loss between the user-item preference matrix and the estimated user-item preference matrix, (ii) the transition regularization penalty, and (iii) a regularization penalty to avoid overfitting.

17. The system of claim 13, the non-transitory computer-readable medium further comprising instructions that are executable by the processing device to:
provide a second recommended item to the user based on the score for each item, wherein a second recommendation includes the first recommended item in the recent subset of the set of related items.

18. The system of claim 17, wherein a second request for the second recommendation from the user device of the user is received before the user interacts with the first recommended item.

19. The system of claim 13, wherein the recent subset of the set of related items includes a most recent item, the most recent item corresponding to a last item in the recent subset of the set of related items that the user interacted with.

20. The system of claim 13, wherein the higher transition value corresponds to a higher number of users transitioning between paired combinations of items in the transition matrix, and wherein a lower transition value corresponds to a lower number of users transitioning between paired combination of items in the transition matrix.

* * * * *